(12) United States Patent
Kim et al.

(10) Patent No.: US 9,670,410 B2
(45) Date of Patent: *Jun. 6, 2017

(54) LIQUID CRYSTAL COMPOSITION

(71) Applicant: INDUSTRY-UNIVERSITY COOPERATION FOUNDATION HANYANG UNIVERSITY, Seoul (KR)

(72) Inventors: Jae-Hoon Kim, Seoul (KR); You-Jin Lee, Seoul (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/411,369

(22) PCT Filed: Jun. 25, 2013

(86) PCT No.: PCT/KR2013/005607
§ 371 (c)(1),
(2) Date: Dec. 24, 2014

(87) PCT Pub. No.: WO2014/003415
PCT Pub. Date: Jan. 3, 2014

(65) Prior Publication Data
US 2015/0137036 A1    May 21, 2015

(30) Foreign Application Priority Data

Jun. 25, 2012  (KR) .................. 10-2012-0067984
Feb. 7, 2013   (KR) .................. 10-2013-0014047

(51) Int. Cl.
*C09K 19/00*  (2006.01)
*C09K 19/02*  (2006.01)
(Continued)

(52) U.S. Cl.
CPC .......... *C09K 19/0266* (2013.01); *C09K 19/00* (2013.01); *C09K 19/02* (2013.01);
(Continued)

(58) Field of Classification Search
None
See application file for complete search history.

(56) References Cited

U.S. PATENT DOCUMENTS

| 4,871,472 A | 10/1989 | Krause et al. |
| 5,332,521 A | 7/1994 | Yuasa et al. |

(Continued)

FOREIGN PATENT DOCUMENTS

| CN | 1290920 A | 4/2001 |
| CN | 1690825 A | 11/2005 |

(Continued)

OTHER PUBLICATIONS

International Search Report for PCT/KR2013/005607 filed on Jun. 25, 2013.

(Continued)

*Primary Examiner* — Chanceity Robinson

(57) ABSTRACT

Provided is a liquid crystal composition. The liquid crystal composition includes 1 to 50 wt % of an achiral smectic liquid crystal, and a remaining amount of a nematic liquid crystal. The nematic liquid crystal includes a negative nematic liquid crystal.

5 Claims, 17 Drawing Sheets

(51) Int. Cl.
*C09K 19/32* (2006.01)
*C09K 19/34* (2006.01)
*C09K 19/40* (2006.01)
*C09K 19/58* (2006.01)
*C09K 19/30* (2006.01)

(52) U.S. Cl.
CPC .......... *C09K 19/0225* (2013.01); *C09K 19/32* (2013.01); *C09K 19/3444* (2013.01); *C09K 19/3497* (2013.01); *C09K 19/406* (2013.01); *C09K 19/586* (2013.01); *C09K 19/588* (2013.01); *C09K 2019/3015* (2013.01); *C09K 2019/3021* (2013.01); *C09K 2019/3422* (2013.01)

(56) References Cited

U.S. PATENT DOCUMENTS

| | | | |
|---|---|---|---|
| 6,056,893 A * | 5/2000 | Reiffenrath | C07C 43/225 252/299.01 |
| 6,738,120 B1 | 5/2004 | Song et al. | |
| 7,872,722 B2 | 1/2011 | Kimura | |
| 2005/0140867 A1 | 6/2005 | Choi | |
| 2005/0213019 A1 | 9/2005 | Choi et al. | |
| 2006/0110550 A1 | 5/2006 | Moriya | |
| 2006/0238696 A1 | 10/2006 | Wen et al. | |
| 2007/0200093 A1 | 8/2007 | West et al. | |
| 2007/0268436 A1 | 11/2007 | Kim et al. | |
| 2009/0103011 A1 | 4/2009 | Bernatz et al. | |
| 2010/0231845 A1 | 9/2010 | Seong et al. | |
| 2011/0063558 A1 | 3/2011 | Ishihara et al. | |
| 2011/0095229 A1 | 4/2011 | Lee et al. | |
| 2011/0140039 A1 | 6/2011 | Wu et al. | |
| 2011/0141417 A1 | 6/2011 | Kim | |
| 2011/0233463 A1 | 9/2011 | Haase et al. | |
| 2012/0032994 A1 | 2/2012 | Coles et al. | |
| 2012/0326083 A1 | 12/2012 | Wand | |
| 2015/0137036 A1 | 5/2015 | Kim et al. | |
| 2015/0198855 A1 | 7/2015 | Kim et al. | |

FOREIGN PATENT DOCUMENTS

| | | | | |
|---|---|---|---|---|
| CN | 102096244 A | 6/2011 | | |
| CN | 102257100 A | 11/2011 | | |
| JP | 2510314 B1 | 4/1996 | | |
| JP | 09-033957 A | 2/1997 | | |
| JP | 2001-296520 A | 10/2001 | | |
| JP | 2001296520 A * | 10/2001 | ........... | G02F 1/1334 |
| JP | 2006-171715 A | 6/2006 | | |
| JP | 2008-518899 A | 6/2008 | | |
| KR | 10-1997-0076049 A | 12/1997 | | |
| KR | 10-1998-0702063 A | 7/1998 | | |
| KR | 10-1999-0027489 A | 4/1999 | | |
| KR | 10-2000-0004396 A | 1/2000 | | |
| KR | 10-2004-0093173 A | 11/2004 | | |
| KR | 10-2006-0056873 A | 5/2006 | | |
| KR | 10-2007-0107319 A | 11/2007 | | |
| KR | 10-2005-0073340 A | 7/2008 | | |
| KR | 10-2012-0010127 A | 2/2012 | | |
| KR | 1020120010127 A1 * | 2/2012 | | |
| WO | WO 96/24880 | 8/1996 | | |
| WO | WO 03/081326 A * | 10/2003 | | |
| WO | WO 03/081326 A1 | 10/2003 | | |
| WO | WO 2006/048620 A2 | 5/2006 | | |

OTHER PUBLICATIONS

Office Action for U.S. Appl. No. 14/411,367, dated Nov. 6, 2015.
International Search Report for PCT/KR2013/005573 filed on Jun. 25, 2013.
Office Action for U.S. Appl. No. 14/411,455, dated Mar. 30, 2016.
International Search Report for PCT/KR2013/005604 filed on Jun. 25, 2013.
International Search Report for PCT/KR2013/005609 filed on Jun. 25, 2013.
Office Action for U.S. Appl. No. 14/411,367, dated Jul. 29, 2016.

* cited by examiner

LIQUID CRYSTAL COMPOSITION

CROSS-REFERENCE TO RELATED APPLICATIONS

This U.S. non-provisional patent application claims priority under 35 U.S.C. §119 of Korean Patent Application Nos. 10-2012-0067984, filed on Jun. 25, 2012, and 10-2013-0014047, filed on Feb. 7, 2013, the entire contents of which are hereby incorporated by reference.

BACKGROUND OF THE INVENTION

The present invention disclosed herein relates to a liquid crystal composition, and more particularly, to a liquid crystal composition including a nematic liquid crystal and a smectic liquid crystal.

A liquid crystal display device is one of widely used flat panel display devices, and researches on high definition, high luminance and large-sized devices are actively conducted. As a part of the researches, the structures of electrodes in the liquid crystal device are diversely changed and complicated to accomplish the high definition, the high luminance and the large-size of the liquid crystal display devices. When a driving voltage is applied to the electrodes, the alignment of liquid crystal molecules in a liquid crystal layer may be changed by an applied electric field. The alignment of the liquid crystal molecules may be non-uniform and unstable due to the electrodes. The non-uniform and unstable alignment of the liquid crystal molecules may deteriorate the luminance of the liquid crystal display device.

SUMMARY OF THE INVENTION

The present invention provides a liquid crystal composition illustrating a uniform and stable alignment.

The present invention should not be constructed as limited to the aspects set forth above. Rather, other aspects not referred to would be apparently understood from the following description to those skilled in the art.

Embodiments of the present invention provide a liquid crystal composition including about 1 to about 50 wt % of an achiral smectic liquid crystal, and a remaining amount of a nematic liquid crystal.

In some embodiments, the nematic liquid crystal may include a negative nematic liquid crystal.

In other embodiments, the liquid crystal composition may further include a chiral liquid crystal.

In still other embodiments, an amount of the chiral liquid crystal may be about 0.01 to about 10 wt % based on the liquid crystal composition.

In even other embodiments, the liquid crystal composition may further include a reactive mesogen material.

In other embodiments of the present invention, a liquid crystal composition is provided. The liquid crystal composition includes about 3 to about 50 wt % of a smectic liquid crystal and a remaining amount of a nematic liquid crystal. The smectic liquid crystal includes about 70 to about 97 wt % of an achiral smectic liquid crystal, and about 3 to about 30 wt % of a chiral smectic liquid crystal.

In some embodiments, the liquid crystal composition may further include a chiral dopant.

In other embodiments, the chiral smectic liquid crystal may have higher spontaneous polarization than the chiral dopant.

In still other embodiments, the nematic liquid crystal may include a negative nematic liquid crystal.

In even other embodiments, the liquid crystal composition may further include a reactive mesogen material.

According to example embodiments, a liquid crystal composition may include a nematic liquid crystal and an achiral smectic liquid crystal. In addition, the liquid crystal composition in accordance with example embodiments may further include a chiral liquid crystal. In a liquid crystal display device including the liquid crystal composition, the uniformity of alignment and the stability of liquid crystal molecules in the liquid crystal composition may be improved to increase the transmittance of the liquid crystal display device.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
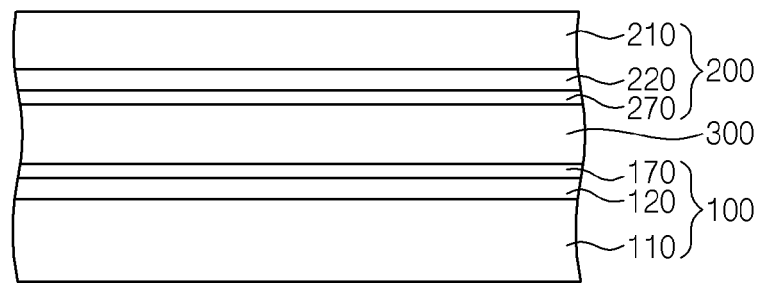
FIG. 1 is a cross-sectional view illustrated for explaining a liquid crystal display device in accordance with an example embodiment.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Those skilled in the art may understand the appropriate working environment of the present inventive concept.

The terminology used herein is for the purpose of describing particular example embodiments only and is not intended to be limiting of the present inventive concept. As used herein, the singular forms are intended to include the plural forms as well, unless the context clearly indicates otherwise. It will be further understood that the terms "comprises" and/or "comprising," when used in this specification, specify the presence of stated features, steps, operations, and/or devices, but do not preclude the presence or addition of one or more other features, steps, operations, and/or devices thereof.

It will also be understood that when a layer (or film) is referred to as being 'on' another layer (or film) or substrate, it can be directly on the other layer (or film) or substrate, or intervening layers (or films) may also be present.

It will be understood that, although the terms first, second, third etc. may be used herein to describe various regions, layers (or films), etc. these regions and layers should not be limited by these terms. These terms are only used to distinguish one region or layer (or film) from another region or layer (film). Thus, a first layer discussed below could be termed a second layer. Example embodiments embodied and described herein may include complementary example embodiments thereof. Unless otherwise defined, all terms (including technical and scientific terms) used herein have the same meaning as commonly understood by one of ordinary skill in the art to which this inventive concept belongs.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, it will be described about an exemplary embodiment of the present invention in conjunction with the accompanying drawings.

Liquid Crystal Composition_First Embodiment

A liquid crystal composition in accordance with example embodiments may include a nematic liquid crystal and an achiral smectic liquid crystal.

The liquid crystal composition may include about 1 wt % to about 50 wt % of an achiral smectic liquid crystal and about 50 wt % to about 99 wt % of a nematic liquid crystal. When the amount of the achiral smectic liquid crystal is less than about 1 wt % based on the total amount of the liquid crystal composition, the alignment of the liquid crystal in the liquid crystal composition may become unstable. In addition, when the amount of the achiral smectic liquid crystal exceeds about 50 wt % of the total amount of the liquid crystal composition, the viscosity of the liquid crystal composition may be increased to decrease the response time of a display device including the liquid crystal composition. More particularly, the liquid crystal composition may include about 1 wt % to about 35 wt % of the achiral smectic liquid crystal.

In accordance with an example embodiment, the amount of the achiral smectic liquid crystal may be determined by the viscosity of the achiral smectic liquid crystal. When the viscosity of the achiral smectic liquid crystal is small, the amount of the achiral smectic liquid crystal in the liquid crystal composition may be about 50 wt % or more. When the viscosity of the achiral smectic liquid crystal is high, the amount may be preferably kept to about 35 wt % or less considering the total viscosity of the liquid crystal composition.

In accordance with an example embodiment, the nematic liquid crystal may include a negative nematic liquid crystal having negative dielectric anisotropy. In accordance with other example embodiments, the nematic liquid crystal may include the negative nematic liquid crystal and a positive nematic liquid crystal having positive dielectric anisotropy. The positive nematic liquid crystal may be about 10 wt % of the nematic liquid crystal.

Hereinafter, exemplary materials of the nematic liquid crystal and the achiral smectic liquid crystal will be explained. However, the nematic liquid crystal and the achiral smectic liquid crystal may not be limited to the following exemplary materials.

First, the properties of the nematic liquid crystal will be explained in brief, and the exemplary materials of the negative nematic liquid crystal and the positive nematic liquid crystal will be classified.

Nematic liquid crystals are liquid crystals having thin and long molecules of which longitudinal axes are aligned in a constant direction even though positioned irregularly to each other. Since each molecule of the nematic liquid crystals may move freely in the longitudinal direction, the nematic liquid crystal molecules may have small viscosity and may easily flow. Since the up and the down directions of the nematic liquid crystals are substantially the same, the polarity may be offset, and ferroelectric properties may not be illustrated in general. Physical properties of the liquid crystal molecules in the axis direction and the vertical direction thereof may be quite different. Thus, the nematic liquid crystal is a material having optical anisotropy. When the difference ($\Delta\in$) between the dielectric anisotropy in the parallel direction to the axis and the dielectric anisotropy in the vertical direction to the axis is less than 0, the liquid crystal may be called the negative nematic liquid crystal, while when greater than 0, the liquid crystal may be called the positive nematic liquid crystal.

Negative Nematic Liquid Crystal

In accordance with an example embodiment, the negative nematic liquid crystal may include negative nematic liquid crystal molecules. In one aspect, the negative nematic liquid crystal molecules may include a single kind. In another aspect, the negative nematic liquid crystal molecules may be a mixture of different kinds. For example, the negative nematic liquid crystal molecules may include first liquid crystal molecules having a first dielectric anisotropy and second liquid crystal molecules having a second dielectric anisotropy. In this case, the second dielectric anisotropy may be different from the first dielectric anisotropy. At least one of the first dielectric anisotropy and the second dielectric anisotropy may have the negative dielectric anisotropy. The nematic liquid crystal may be sufficient only when the total dielectric anisotropy of the nematic liquid crystal molecules including the first liquid crystal molecules and the second liquid crystal molecules has the negative dielectric anisotropy.

In accordance with another example embodiment, the negative nematic liquid crystal may include the negative nematic liquid crystal molecules and base liquid crystal molecules. Each of the base liquid crystal molecules may include at least one selected from the group consisting of a negative liquid crystal molecule, a positive liquid crystal molecule, a neutral liquid crystal molecule, a chiral liquid crystal molecule and an achiral liquid crystal molecule. In one aspect, the negative nematic liquid crystal may include one kind of negative nematic liquid crystal molecules and base liquid crystal molecules. In another aspect, the negative nematic liquid crystal may include liquid crystal molecules having diverse kinds of negative liquid crystal molecules and base liquid crystal molecules.

Hereinafter, exemplary materials of the negative nematic liquid crystal will be explained. The following materials may be used alone or as a mixture type.

The negative nematic liquid crystal may include halogen group, cyanide group or isocyanate group nematic liquid crystal. The negative nematic liquid crystal may use the halogen group, the cyanide group or the isocyanate group nematic liquid crystal alone or as a mixture thereof. As described above, the negative nematic liquid crystal molecules may further include the base liquid crystal molecules.

The halogen group negative nematic liquid crystal may include fluorine group, chlorine group or bromine group material and may have a single ring structure or a polyring structure.

The halogen group negative nematic liquid crystal having a two ring structure may be represented by following Chemical Formulae 1 and 2.

Chemical Formula 1

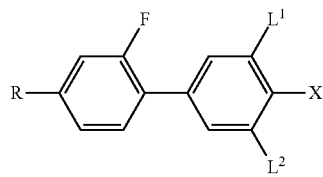

Chemical Formula 2

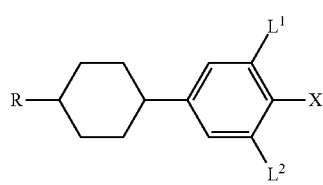

In Chemical Formulae 1 and 2, R is an alkyl or an alkoxy having 1 to 15 carbon atoms (in which hydrogen may be substituted with CN, $CF_3$ or a halogen, and —$CH_2$— group may be substituted with —CH═CH—, —O—, —CO—, —COO—, —OOC—, —O—OC—O— or —S—), X is independently a halogen, a halogenated alkyl, a halogenated alkoxy, a halogenated alkenyl or a halogenated oxy having 1 to 15 carbon atoms, and $L^1$ and $L^2$ are independently hydrogen or a halogen.

The halogen group negative nematic liquid crystal having a three ring structure may be represented by following Chemical Formulae 3 to 6.

Chemical Formula 3

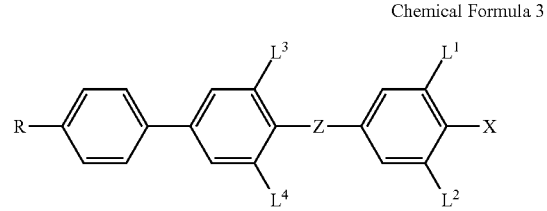

Chemical Formula 4

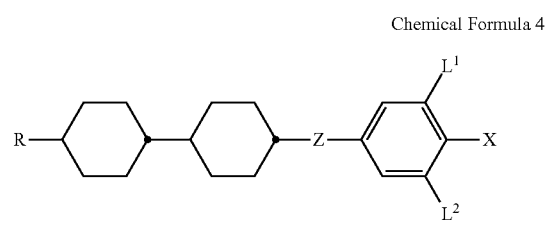

Chemical Formula 5

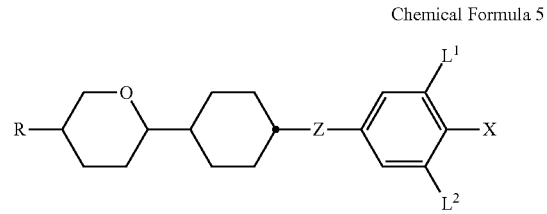

Chemical Formula 6

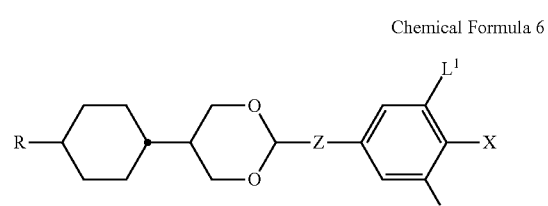

In Chemical Formulae 3 to 6, R, $L_1$ and $L_2$ are the same as defined in Chemical Formulae 1 and 2, $L_3$ and $L_4$ are independently hydrogen or a halogen, and Z represents a single bond, —$CF_2O$—, —$OCF_2$—, —COO—, —O—CO—, —$CH_2CH_2$—, —CH═CH—, —C≡C—, —$CH_2O$—, —$(CH_2)_4$—, —CF═CF—, —CH═CF— or —CF═CH—.

The halogen group negative nematic liquid crystal having a four ring structure may be represented by following Chemical Formulae 7 to 9.

Chemical Formula 7

Chemical Formula 8

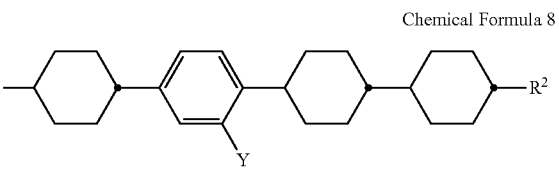

Chemical Formula 9

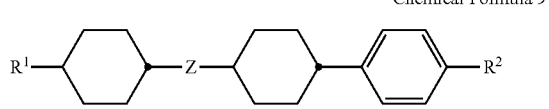

In Chemical Formulae 7 to 9, Y represents hydrogen or a halogen, R¹ is an alkyl or an alkenyl having 1 to 15 carbon atoms, R² is an alkyl, an alkenyl or an alkoxy having 1 to 15 carbon atoms (in R¹ and R², the hydrogen may be substituted with CN, CF₃ or a halogen atom, and CH₂ group may be substituted with —O—, —S—, —C≡C—, —CH=CH—, —OC—O— or —O—CO—), and Z represents a single bond, —CF₂O—, —OCF₂—, —COO—, —O—CO—, —CH₂CH₂—, —CH=CH—, —C≡C—, —CH₂O—, —(CH₂)₄—, —CF=CF—, —CH=CF— or —CF=CH—.

The halogen group negative nematic liquid crystal having a fluorinated indane derivative at the side portion may be represented by following Chemical Formula 10.

Chemical Formula 10

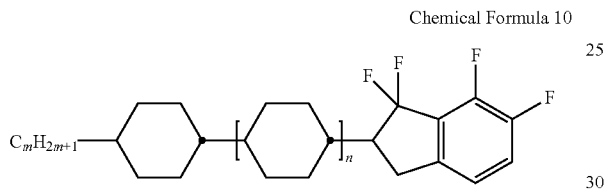

In Chemical Formula 10, m represents an integer, and n is 0 or 1.

The cyanide group negative nematic liquid crystal may be represented by following Chemical Formulae 11 to 13.

Chemical Formula 11

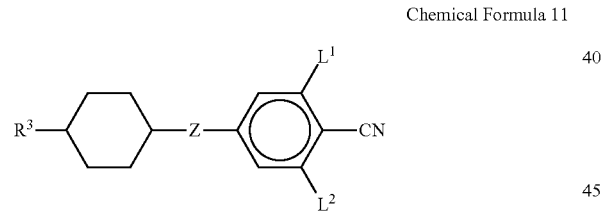

Chemical Formula 12

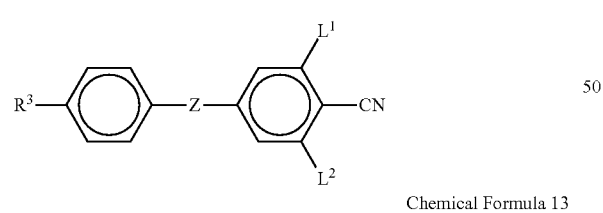

Chemical Formula 13

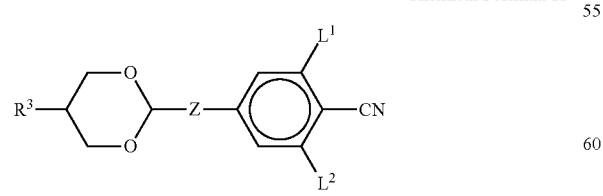

In Chemical Formulae 11 to 13, R³ is an alkyl group having 1 to 15 carbon atoms (in which, the hydrogen may be unsubstituted or at least monosubstituted with CN, CF₃ or a halogen atom, and CH₂ group may be substituted with —O—, —S—, —C≡C—, —CH=CH—, —OC—O— or —O—CO—), L¹ and L² are independently hydrogen or a halogen, and Z represents a single bond, —CF₂O—, —OCF₂—, —COO—, —O—CO—, —CH₂CH₂—, —CH=CH—, —C≡C—, —CH₂O—, —(CH₂)₄—, —CF=CF—, —CH=CF— or —CF=CH—.

The negative nematic liquid crystal may include a single material or a mixture. In example embodiments, the negative nematic liquid crystal mixture having may include, (a) a liquid crystal component A including at least one compound having the dielectric anisotropy of about −1.5 or less;

(b) a liquid crystal component B including at least one compound having the dielectric anisotropy of about −1.5 to about +1.5; and (c) a chiral component C.

The chiral component A may include at least one compound of Chemical Formulae 14 to 17.

Chemical Formula 14

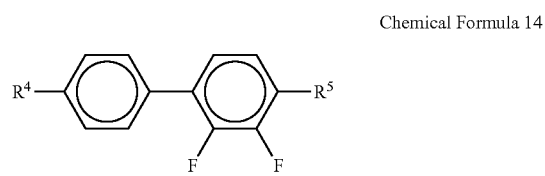

Chemical Formula 15

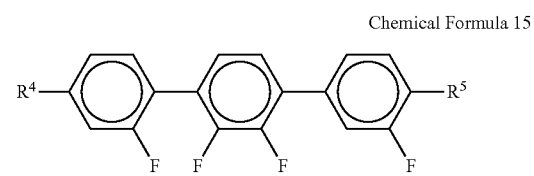

Chemical Formula 16

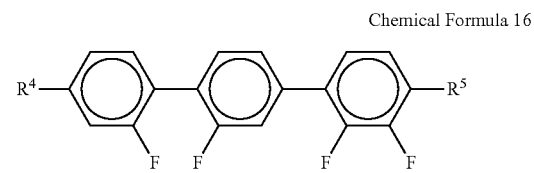

Chemical Formula 17

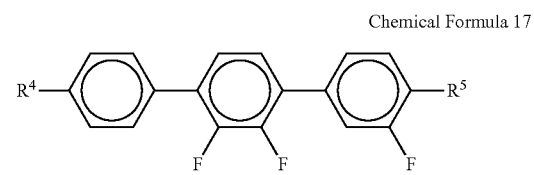

The liquid crystal component B may include at least one compound of Chemical Formulae 18 to 20. The liquid crystal component B may be first base liquid crystal molecules.

Chemical Formula 18

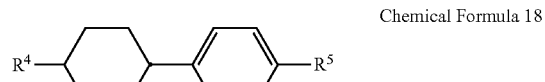

Chemical Formula 19

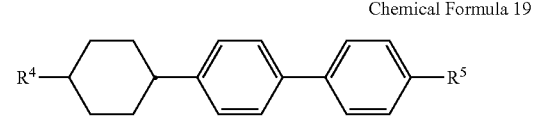

Chemical Formula 20

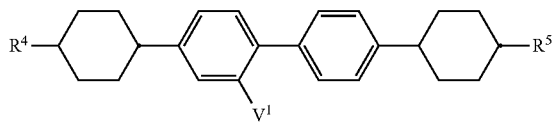

In Chemical Formulae 18 to 20, $R^4$ and $R^5$ are independently an alkyl, an alkoxy, an alkoxy alkyl, an alkenyl or an alkenyl oxy having 1 to 15 carbon atoms (in which, hydrogen may be substituted with CN, $CF_3$ or a halogen atom, and $-CH_2-$ group may be substituted with $-CH=CH-$, $-O-$, $-CO-$, $-COO-$, $-OOC-$, $-O-OC-O-$ or $-S-$), and $Y^1$ represents hydrogen or a halogen.

The chiral component C may include a plurality of the following chiral dopants. The selection of the chiral dopant itself is not important.

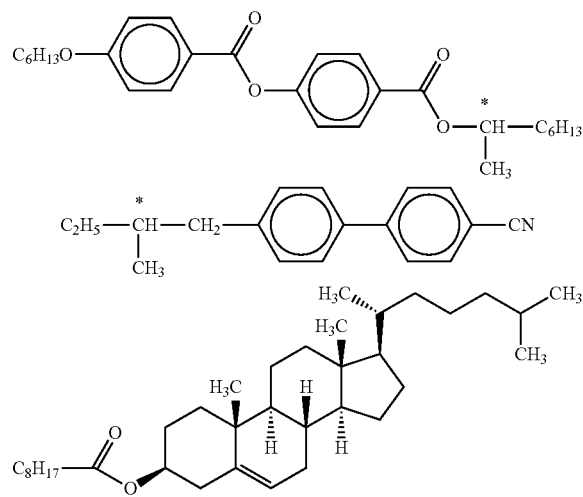

Positive Nematic Liquid Crystal

In accordance with example embodiments, the positive nematic liquid crystal may include positive nematic liquid crystal molecules. In one aspect, the positive nematic liquid crystal molecules may include single kind. In another aspect, the positive nematic liquid crystal molecules may be a mixture of different kinds. For example, the positive nematic liquid crystal molecules may include first liquid crystal molecules having a first dielectric anisotropy and second liquid crystal molecules having a second dielectric anisotropy. In this case, the second dielectric anisotropy may be different from the first dielectric anisotropy. At least one of the first dielectric anisotropy and the second dielectric anisotropy may have the positive anisotropy. The nematic liquid crystal may be sufficient only when the total dielectric anisotropy of the nematic liquid crystal molecules including the first liquid crystal molecules and the second liquid crystal molecules has the positive dielectric anisotropy.

In accordance with other example embodiments, the positive nematic liquid crystal may include the positive nematic liquid crystal molecules and base liquid crystal molecules. Each of the base liquid crystal molecules may include at least one selected from the group consisting of a negative liquid crystal molecule, a positive liquid crystal molecule, a neutral liquid crystal molecule, a chiral liquid crystal molecule and an achiral liquid crystal molecule. In one aspect, the positive nematic liquid crystal may include liquid crystal molecules having various kinds of positive liquid crystal molecules and base molecules. In another aspect, the positive nematic liquid crystal may include liquid crystal molecules having various kinds of positive liquid crystal molecules and base liquid crystal molecules.

Hereinafter, exemplary materials of the positive nematic liquid crystal will be explained. The following materials may be used alone or as a mixture type.

The positive nematic liquid crystal may include cyanide group, isocyanate group or halogen group nematic liquid crystals. The positive nematic liquid crystal may use the cyanide group, the isocyanate group or the halogen group nematic liquid crystal alone or as a mixture type. In addition, the positive nematic liquid crystal may further include two kinds of the base liquid crystal molecules.

The cyanide group positive nematic liquid crystal may have a two ring structure or a three ring structure.

The cyanide group positive nematic liquid crystal having the two ring structure may be represented by following Chemical Formula 21.

Chemical Formula 21

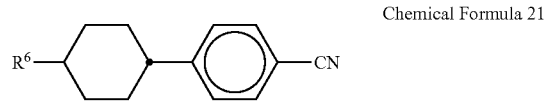

In Chemical Formula 21, $R^6$ is an alkenyl having 1 to 15 carbon atoms (in which, hydrogen may be substituted with CN, $CF_3$ or a halogen, and $-CH_2-$ group may be optionally substituted with $-CH=CH-$, $-O-$, $-CO-$, $-COO-$, $-OOC-$, $-O-OC-O-$ or $-S-$). Particular examples of Chemical Formula 21 are illustrated as follows.

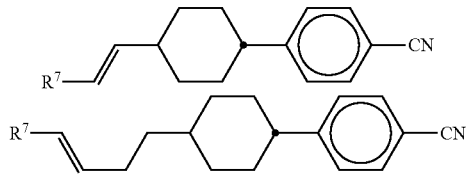

In Chemical Formula 21, $R^7$ is H, $CH_3$, $C_2H_5$ or n-$C_3H_7$.

The positive nematic liquid crystal and a three ring structure may be represented by following Chemical Formula 22.

Chemical Formula 22

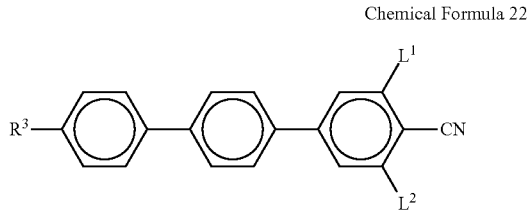

$R^3$ is an alkyl group having 15 or less carbon atoms and unsubstituted or at least monosubstituted with CN, $CF_3$ or a halogen, as defined in Chemical Formulae 11 to 13, in which at least one $CH_2$ group may be replaced with $-O-$, $-S-$, $-C\equiv C-$, $-C=C-$, $-OC-O-$ or $-O-CO-$, and $L^1$ and $L^2$ are independently hydrogen or a halogen.

The isocyanate group positive nematic liquid crystal may be represented by following Chemical Formula 23.

Chemical Formula 23

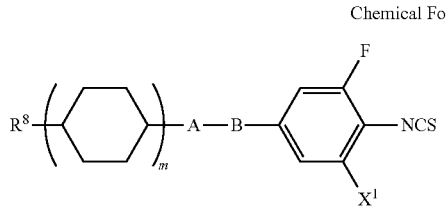

In Chemical Formula 23, $R^8$ is $C_nH_{2n+1}O$, $C_nH_{2n+1}$ or $C_nH_{2n-1}$, in which n is 1 to 15, A is

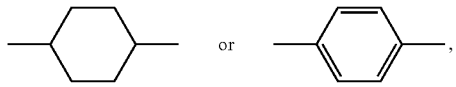

B is —$CH_2$—$CH_2$— or —C≡C—, $X^1$ is hydrogen or a halogen, and m is 1, 2, 3 or 4. Particular examples of Chemical Formula 23 are as follows.

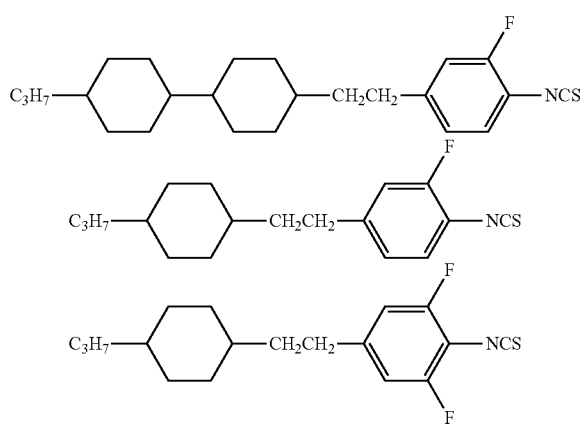

The halogen group positive nematic liquid crystal may include a fluorine group material or a chlorine group material, and may have a single or polyring structure. The fluorine group positive nematic liquid crystal may be represented by following Chemical Formulae 24 to 27.

Chemical Formula 24

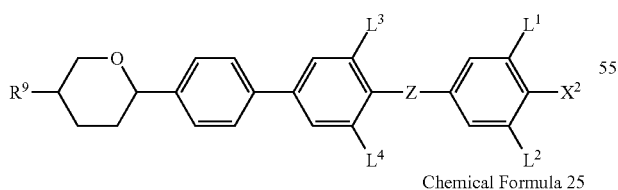

Chemical Formula 25

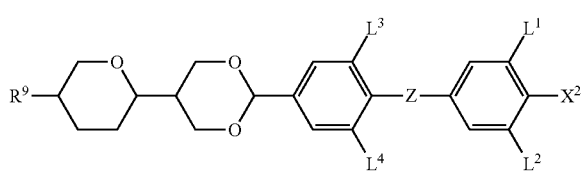

Chemical Formula 26

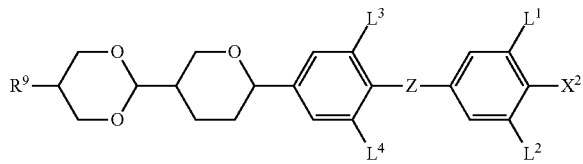

Chemical Formula 27

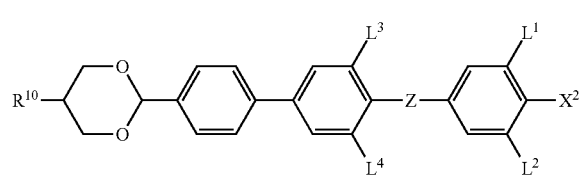

In Chemical Formulae 24 to 27, $R^9$ and $R^{10}$ are an alkyl, an alkoxy, a fluorinated alkyl, a fluorinated alkoxy, an alkenyl, an alkenyloxy, an alkoxy alkyl or a fluorinated alkenyl having 1 to 15 carbon atoms, $L^1$, $L^2$, $L^3$ and $L^4$ are independently hydrogen or fluorine, and Z represents a single bond, —$CF_2O$—, —$OCF_2$—, —COO—, —O—CO—, —$CH_2CH_2$—, —CH=CH—, —C≡C—, —$CH_2O$—, —$(CH_2)_4$—, —CF=CF—, —CH=CF— or —CF=CH—.

The halogen group positive nematic liquid crystal having a two ring structure may be represented by following Chemical Formula 28.

Chemical Formula 28

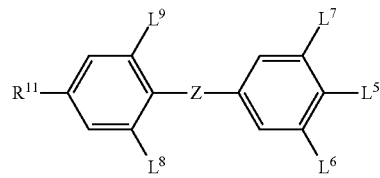

In Chemical Formula 28, $R^{11}$ represents hydrogen, a halogen, an alkenyl, an alkenyloxy, an alkynyl or an alkynoxy having 1 to 15 carbon atoms, and at least one —$CH_2$— group in $R^{11}$ may be substituted with —O—, C=O or —S—, $L^5$ is a halogen, a fluorinated alkyl, a fluorinated alkoxy, a fluorinated alkenyl, an alkenyloxy or an oxyalkyl having 1 to 15 carbon atoms, —$OCF_3$—, —$OCHFCF_3$ or $SF_5$, $L^6$, $L^7$, $L^8$ and $L^9$ are independently hydrogen (H) or a halogen, and Z represents a single bond, —$CF_2O$—, —$OCF_2$—, —COO—, —O—CO—, —$CH_2CH_2$—, —CH=CH—, —C≡C—, —$CH_2O$—, —$(CH_2)_4$—, —CF=CF—, —CH=CF— or —CF=CH—. Particular examples of Chemical Formula 28 are as follows.

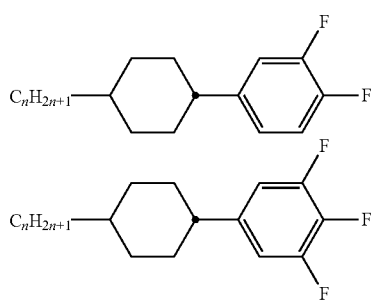

-continued

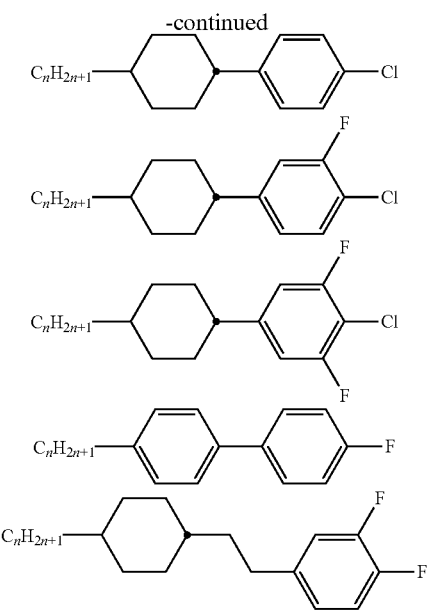

In the above Chemical Formulae, n is 1 to 15.

The halogen group positive nematic liquid crystal having a two ring structure may be represented by following Chemical Formulae 29 to 33.

Chemical Formula 29

Chemical Formula 30

Chemical Formula 31

Chemical Formula 32

Chemical Formula 33

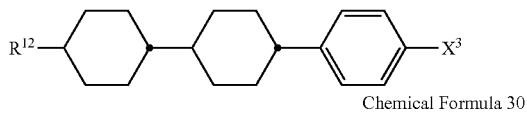
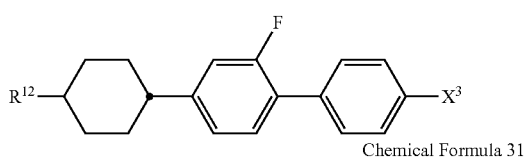
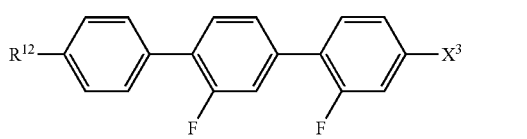
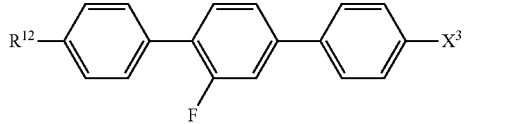
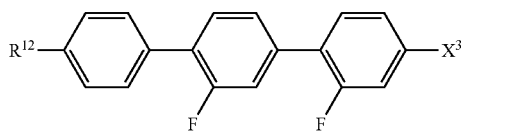

In Chemical Formulae 29 to 33, $R^{12}$ is an alkyl or an alkenyl having 1 to 15 carbon atoms (in which, the alkyl or the alkenyl may be unsubstituted or monosubstituted by at least one of CN, $CF_3$, or a halogen, and at least one of —$CH_2$— group may be substituted with —O—), and $X^3$ is —F, —Cl, —$OCF_3$, —$OCHF_2$, —$OCH_2F$ or —$CF_3$. Particular examples of Chemical Formula 29 are as follows.

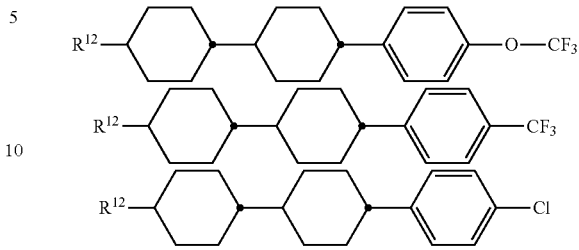

In the above Chemical Formulae, $R^{12}$ is the same as defined above.

The halogen group positive nematic liquid crystal having a four ring structure may be represented by following Chemical Formulae 34 to 36.

Chemical Formula 34

Chemical Formula 35

Chemical Formula 36

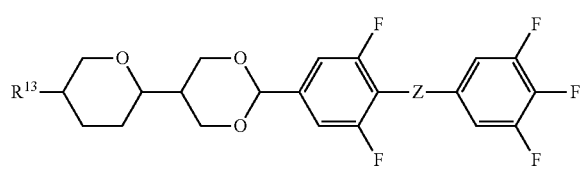

In Chemical Formulae 34 to 36, $R^{13}$ is an alkyl, an alkoxy or an alkenyl having 1 to 15 carbon atoms (in which, the hydrogen in the alkyl, the alkoxy or the alkenyl may be substituted with CN, $CF_3$, or a halogen, and —$CH_2$— group may be substituted with —CH=CH—, —O—, —CO—, —COO—, —OOC—, —O—OC—O— or —S—), and Z represents a single bond, —$CF_2O$—, —$OCF_2$—, —COO—, —O—CO—, —$CH_2CH_2$—, —CH=CH—, —C≡C—, —$CH_2O$—, —$(CH_2)_4$—, —CF=CF—, —CH=CF— or —CF=CH—.

The positive nematic liquid crystal having trisubstituted fluoride or cyanide groups may be represented by following Chemical Formula 37.

Chemical Formula 37

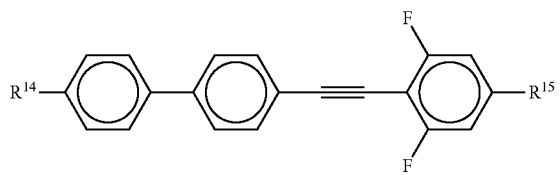

In Chemical Formula 37, at least one of $R^{14}$ and $R^{15}$ is an alkenyl group having 15 or less carbon atoms and unsubstituted or at least monosubstituted with CN, $CF_3$, or a halogen, and the other one of $R^{14}$ and $R^{15}$ is an alkyl group having 15 or less carbon atoms and unsubstituted or at least monosubstituted with CN, $CF_3$, or a halogen, and in which, at least one $CH_2$ group may be substituted with —O—, —S—, —C≡C—, —OCO— or —O—CO—. Particular examples of Chemical Formula 37 are illustrated as follows.

Chemical Formula 38

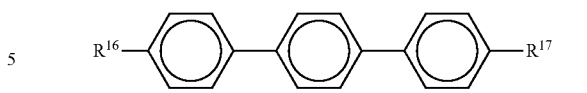

In Chemical Formula 38, $R^{16}$ and $R^{17}$ may be the same or different and independently represent an alkyl having less than 15 carbon atoms and unsubstituted or at least monosubstituted with CN, $CF_3$, or a halogen, in which, at least one $CH_2$ in the alkyl may be replaced with —O—, —S—, —C≡C—, —CH=CH—, —OC—O— or —OCO—, and the 1,4-phenylene ring may be independently monosubstituted or polysubstituted with fluorine.

Achiral Smectic Liquid Crystal

Smectic liquid crystals may be found at a lower temperature than the nematic liquid crystal, and liquid crystals having a rod shape may form a laminated structure to align

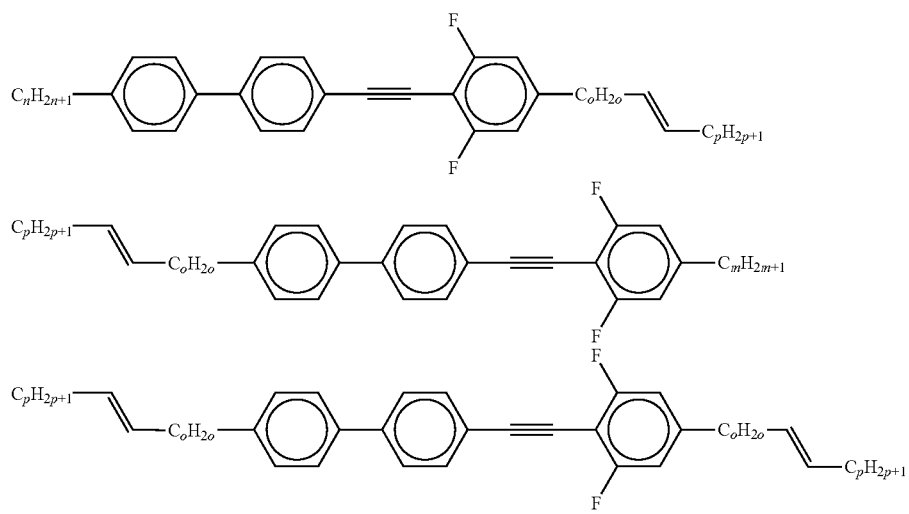

In the above Chemical Formulae, n and m are 1 to 10, preferably 1 to 5, o and p are independently the same or different and 0 to 10, preferably 0 to 5, and o+p is preferably 7 or less.

The positive nematic liquid crystal may include a single material or a mixture. In example embodiments, the positive nematic liquid crystal mixture may include, (a) a liquid crystal component A including at least one compound having the dielectric anisotropy of about +1.5 or over;

(b) a liquid crystal component B including at least one compound having the dielectric anisotropy of about −1.5 to about +1.5; and (c) a chiral component C as occasion demands.

The liquid crystal component A may include at least one compound of Chemical Formula 37. The liquid crystal component B may include at least one compound of Chemical Formula 38. The liquid crystal component B may include the above-mentioned two base liquid crystal molecules.

The component C may include a plurality of commercially available chiral dopants such as cholesteryl nonanoate (CN), R-811, S-811, S-1011, S-2011 (Merck KGaA at Darmstadt, Germany) and CB15 (BDH Chemicals Ltd., at Poole, England)). The selection of the dopant itself is insignificant.

the liquid crystals in parallel to each other. With respect to the plane, the position of the liquid crystals may illustrate no order, however, with respect to the vertical direction of the layer, the positional order of the liquid crystal may be maintained. The bonding force between molecular planes may be relatively weak, and have easily slidable properties. Thus, the smectic liquid crystal may illustrate two dimensional liquid properties. However, the viscosity may be very high when compared with a common liquid.

The achiral smectic liquid crystal may have various structures according to the alignment of the liquid crystal. For example, a smectic A liquid crystal may be vertically aligned to the molecular plane. In another example, a smectic C liquid crystal may be aligned to the molecular plane with a certain angle. In further another example, a smectic B liquid crystal may be vertically aligned to the molecular plane and may be aligned in a hexagonal network structure in the molecular plane. The kinds of the smectic liquid crystals may be diverse, and the kind of the smectic liquid crystal may not be limited to the above-described ones in example embodiments.

In accordance with example embodiments, the achiral smectic liquid crystal may include achiral smectic liquid crystal molecules. In one aspect, the achiral smectic liquid crystal molecules may include a single kind. In another aspect, the achiral smectic liquid crystal molecules may be a mixture of different kinds. For example, the achiral smectic liquid crystal molecules may include first achiral smectic liquid crystal molecules and second achiral smectic liquid crystal molecules. In this case, the second achiral smectic liquid crystal molecules may be different from the first achiral smectic liquid crystal molecules.

In accordance with another example embodiment, the achiral smectic liquid crystal may include the achiral smectic liquid crystal molecules and base liquid crystal molecules. Each of the base liquid crystal molecules may include at least one selected from the group consisting of a liquid crystal molecule having the negative dielectric anisotropy, a liquid crystal molecule having the positive dielectric anisotropy, and a neutral liquid crystal molecule. In one aspect, the achiral smectic liquid crystal may include one kind of achiral smectic liquid crystal molecules and the base molecules. In another aspect, the achiral smectic liquid crystal may include different achiral smectic liquid crystal molecules and the base molecules.

Hereinafter, examples on the achiral smectic liquid crystal will be illustrated and explained. The following materials may be used alone or as a mixture type. The achiral smectic liquid crystal may include smectic A liquid crystal, smectic B liquid crystal, and smectic C liquid crystal.

The smectic liquid crystal may be represented by following Chemical Formulae 39 to 41.

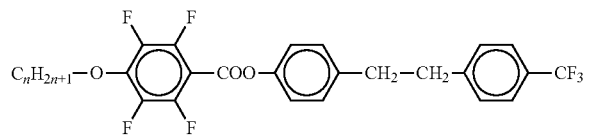

Chemical Formula 40

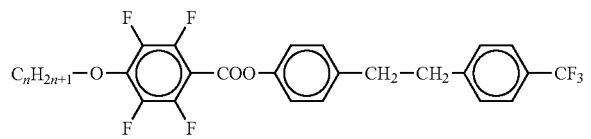

in which, $1 \leq n \leq 15$.

 Chemical Formula 41 in which, Ph is 1,4-phenylene group.

The smectic B liquid crystal may include 4-hexyl-4'-[2-(4-isothiocyanatophenyl)ethyl]-1-1'-biphenyl at a temperature from about 60.3° C. to about 98.5° C. In addition, the smectic B liquid crystal may include at least one selected from the group consisting of 1-[5-(4-hexylphenyl)pyramidyl-2]-2-(4-hexyloxyphenyl)ethane, PhPhCHNPhCHCHCOOCH$_2$CH(CH$_3$)$_2$, C$_6$H$_{13}$OPhCHNPhPh, C$_8$H$_{17}$OPhPhCOOPhOC$_5$H$_9$, C$_8$H$_{17}$PhPhCOOPhC$_8$H$_{17}$, C$_8$H$_{17}$OPhPhCOOPhOC$_7$H$_{17}$, C$_5$H$_{11}$OPhCHNPhPh and C$_{16}$H$_{33}$OPhCHNPhPh.

The smectic C liquid crystal may be represented by following Chemical Formulae 42 to 44.

Chemical Formula 42

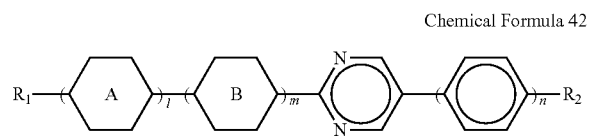

In Chemical Formula 42, each of A and B independently is a benzene ring or a cyclohexane ring, m and n are 0 or 1, and each of R$_1$ and R$_2$ is an alkyl group, an alkoxy group or an alkanoyloxy group having 1 to 18 carbon atoms.

Chemical Formula 43

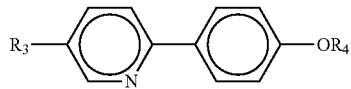

In Chemical Formula 43, each of R$_3$ and R$_4$ is an alkyl group having 1 to 18 carbon atoms.

Chemical Formula 44

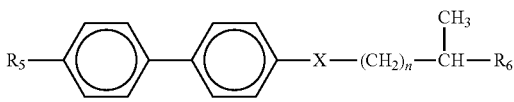

In Chemical Formula 44, X is a cobalt bond or —O—, n is 0 to 10, R$_5$ is an alkyl group or an alkoxy group having 1 to 18 carbon atoms and R$_6$ is an alkyl group having 2 to 18 carbon atoms.

In accordance with example embodiments, through including the nematic liquid crystal and the achiral smectic liquid crystal in the liquid crystal composition, the alignment of the liquid crystal composition may become uniform, and the alignment stability may be improved.

In accordance with other example embodiments, the liquid crystal composition may further include a chiral liquid crystal. The liquid crystal composition may include a chiral liquid crystal, an achiral smectic liquid crystal and a nematic liquid crystal. In the liquid crystal composition, the total amount of the chiral liquid crystal and the achiral smectic liquid crystal may be about 1 to about 50 wt %. Particularly, the chiral liquid crystal may include about 0.01 to about 10 wt % based on the liquid crystal composition.

In one aspect, the chiral liquid crystal may include chiral liquid crystal molecules. Particularly, the chiral liquid crystal molecules may include one kind. Alternatively, the chiral liquid crystal molecules may include different kinds of liquid crystal molecules. For example, the chiral liquid crystal molecules may include chiral liquid crystal molecules having spontaneous polarization and chiral liquid crystal molecules not having the spontaneous polarization. In addition, the chiral liquid crystal molecules may include chiral liquid crystal molecules having different spontaneous polarizations.

In another aspect, the chiral liquid crystal along with the achiral smectic liquid crystal may function as a ferroelectric material. The ferroelectric liquid crystal has the spontaneous polarization even though not applying an electric field and is one of electrically insulating and dielectric material. However, different from common dielectric materials, the dielectric polarization of the ferroelectric material is not proportional to the electric field, and the relation between the polarity and the electric field illustrates an abnormality having an electric hysteresis. The ferroelectric liquid crystal may typically have the spontaneous polarization and may have properties of illustrating polarization reversal of the spontaneous polarization due to the electric field.

Hereinafter, examples of the chiral liquid crystal will be illustrated and explained. However, the chiral liquid crystal may not be limited to the following materials.

The chiral liquid crystal may include fluorine chiral end liquid crystal, chiral allyl ester liquid crystal, center core polyring chiral liquid crystal, or chiral smectic liquid crystal, etc. In addition, the chiral liquid crystal may be a banana shape liquid crystal.

The fluorine chiral end liquid crystal may be represented by following Chemical Formula 45.

Chemical Formula 45

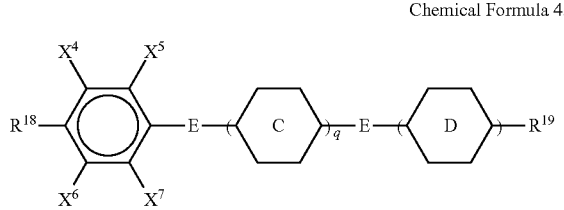

In Chemical Formula 45, $X^4$, $X^5$, $X^6$ and $X^7$ are independently $CF_3$, $CF_2H$, $CFH_2$, a halogen, an alkyl or an alkoxy, C and D are independently selected from phenyl, mono-fluorophenyl, di-fluorophenyl or cyclo-hexyl, E is independently selected from a single bond, COO, OOC and C≡C, at least one of E is the single bond, q is 0 or 1, and $R^{18}$ is an end group of following Chemical Formula 46.

Chemical Formula 46

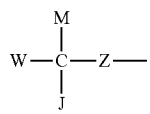

In Chemical formula 46, Z is O, $(CH_2)_1O$ or $(CH_2)_2O$, J and M are independently selected from hydrogen, and an alkyl having 1 to 15 carbon atoms, W is a linear or branched alkyl chain having 1 to 15 carbon atoms, J, M and W are different from each other, and $R^{19}$ is selected from an alkenyl, an alkenyloxy, an alkynyl or an alkynyloxy having 1 to 15 carbon atoms.

The chiral allyl ester liquid crystal may be represented by following Chemical Formula 47.

Chemical Formula 47

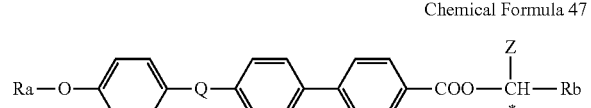

In Chemical formula 47, Ra and Rb are independently an alkyl having 1 to 20 carbon atoms, Q is —C(=O)O— or —OC(=O)—, Z represents a fluorine containing alkyl group or a halogen substituted alkyl group, and * represents a chiral carbon. Particular example on Chemical Formula 41 may include 4'-n-octyloxyphenyl-4'-(1,1,1-trifluoro-2-octyloxycarbonyl)biphenyl-4-carboxylate having the following structure.

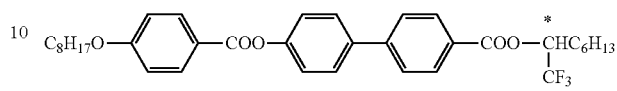

The center core polyring chiral liquid crystal may be represented by Chemical Formulae 48 to 51

Chemical Formula 48

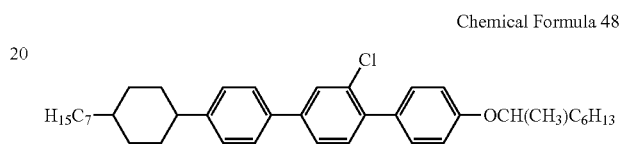

Chemical Formula 48 is S-4-(trans-4-heptylcyclohexyl)-3'-chloro-4"-(1-methylheptyloxy)terphenyl.

Chemical Formula 49

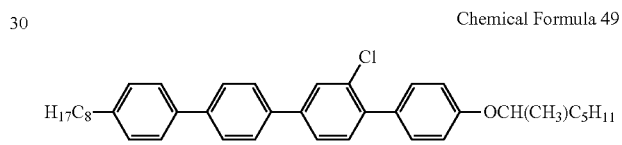

Chemical Formula 49 is R-4-octyl-3"-chloro-4"'-(1-methylhexyloxy)quaterphenyl.

Chemical Formula 50

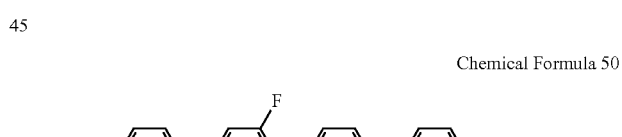

Chemical Formula 50 is S-4-nonyl-3'-fluoro-4"'-(2-chloropropyloxy)quaterphenyl.

Chemical Formula 51

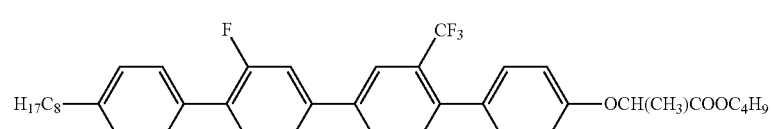

Chemical Formula 51 is butyl S-2-(4-octyl-2'-fluoro-3"'-trifluoromethyl-4"'-quaterphenyloxy)-propionate.

The chiral liquid crystal may be represented by at least one of Chemical Formula 52 and Chemical Formula 53.

Chemical Formula 52

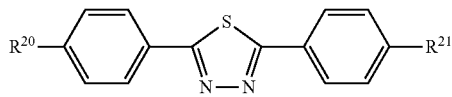

Chemical Formula 53

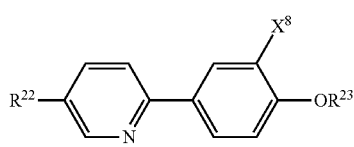

In Chemical Formulae 52 and 53, each of $R^{20}$ and $R^{21}$ is a linear alkyl group having different carbon atoms from 1 to 9, each of $R^{22}$ and $R^{23}$ may be the same or different linear alkyl group of 1 to 18 carbon atoms (in $R^{20}$ to $R^{23}$, hydrogen may be substituted with CN, $CF_3$, or a halogen atom, and —$CH_2$— group may be optionally substituted with —CH=CH—, —O—, —CO—, —COO—, —OOC—, —O—OC—O— or —S—), and X represents hydrogen or a halogen. Particular examples on Chemical Formulae 52 and 53 are as follows.

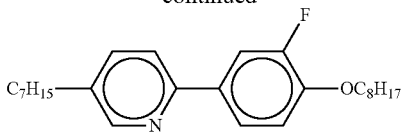

The chiral smectic liquid crystal may be represented by following Chemical Formula 54.

Chemical Formula 54

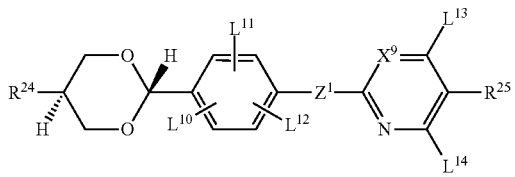

In Chemical Formula 54, $R^{24}$ is chiral or achiral alkyl or alkenyl having 1 to 20 carbon atoms, $R^{25}$ is chiral or achiral alkoxy, alkenyloxy, alkylcarbonyloxy (alkyl-COO—) or alkenylcarbonyloxy (alkenyl-COO—) having 1 to 20 carbon atoms (in $R^{24}$ and $R^{25}$, hydrogen may be substituted with CN, $CF_3$ or a halogen atom, and —$CH_2$— group may be substituted with —CH=CH—, —O—, —CO—, —COO—, —OOC—, —O—OC—O— or —S—), $Z^1$ is a single bonding, —COO— or —OOC—, —$CH_2CH_2$—, —CH=CH—, —C≡C—, —$OCH_2$— or —$CH_2O$—, $L^{10}$ to $L^{14}$ are hydrogen, a halogen, a cyano, a nitro, an alkyl or an alkenyl having 1 to 20 carbon atoms (—$CH_2$— group may be substituted with —CH=CH—, —O—, —CO—, —COO—, —OOC—, —O—OC—O— or —S—), and $X^9$ is —CH— or nitrogen. Particular example of Chemical Formula 49 is illustrated as follows.

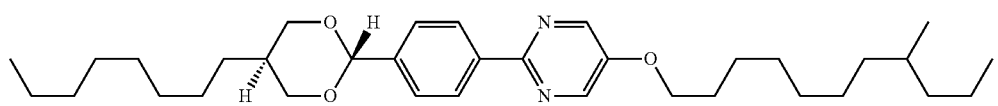 [SMILES: CCCCCCCC[C@H]1CO[C@H](c2ccc(-c3ncc(OCCCCCCCC(C)CCC)cn3)cc2)OC1]

The banana shape chiral liquid crystal may be represented by following Chemical Formula 55.

Chemical Formula 55

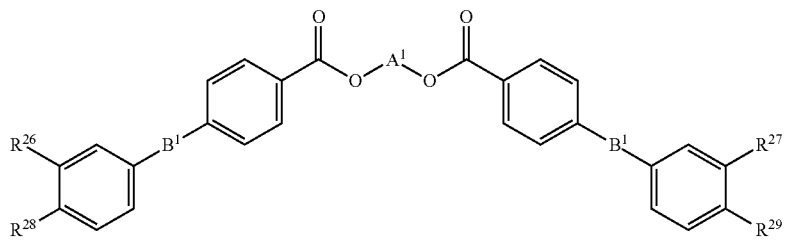

In Chemical Formula 55, $A^1$ is

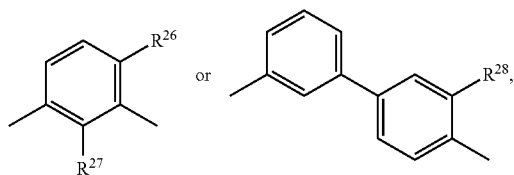

$B^1$ is —N=CH— or —OOC—, $R^{26}$ and $R^{27}$ are independently hydrogen or a halogen, and $R^{28}$ and $R^{29}$ are independently an alkyl or an alkoxy having 8 to 16 carbon atoms. Particular examples of Chemical Formula 55 are illustrated as follows.

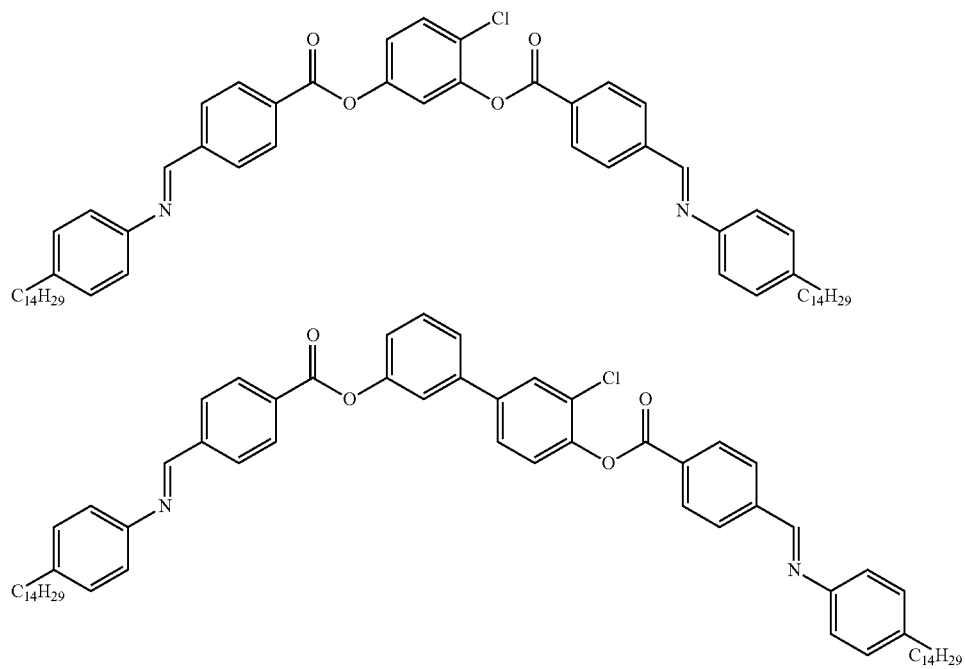

The chiral liquid crystal may be a single material of the chiral liquid crystal or a mixture including the chiral liquid crystal.

Chemical Formula 56

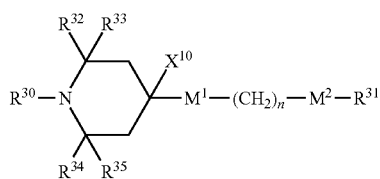

In Chemical Formula 56, $X^{10}$ is hydrogen (H), $R^{30}$ is hydrogen or an alkyl of 1 to 15 carbon atoms, $R^{31}$ is hydrogen, a halogen, or an alkyl group or an alkenyl group of 1 to 20 carbon atoms (in which, one or two —$CH_2$— groups may be substituted with —O—, —C(=O)O— or —Si(CH$_3$)$_2$—, and at least one of hydrogen of the alkyl or the alkenyl group may be substituted with fluorine or CH$_3$), and $R^{32}$, $R^{33}$, $R^{34}$ and $R^{35}$ are independently CH$_3$.

In accordance with example embodiments, the liquid crystal composition may include the nematic liquid crystal and the achiral smectic liquid crystal, and the alignment of the liquid crystal composition may become uniform and the alignment stability may be improved. In addition, since the liquid crystal composition includes the chiral liquid crystal along with the achiral smectic liquid crystal, ferroelectric properties may be illustrated, and the alignment of the liquid crystal composition may become more uniform and the stability of the liquid crystal may be further improved.

In accordance with other example embodiments, the liquid crystal composition may further include a reactive mesogen. The liquid crystal composition may include about 0.01 wt % to about 3 wt % of the reactive mesogen material, about 1 wt % to about 50 wt % of the achiral smectic liquid crystal and a remaining amount of the nematic liquid crystal.

The reactive mesogen material represents a polymerizable mesogenic compound. The "mesogenic compound" or the "mesogenic material" may include a material or a compound including a rod shape, a plate shape or a disc shape mesogenic group, i.e. a group capable of inducing liquid crystalline behavior. The reactive mesogen material may be polymerized by a light such as ultraviolet and may be a material aligned depending on the alignment of adjacent materials.

Examples of the reactive mesogen material may include the compounds represented by following structure.

P1-A1-(Z1-A2)$_n$-P2

In the above structure, P1 and P2 are at least one among acrylate, methacrylate, vinyl, vinyloxy and epoxy group, A1 and A2 are at least one among 1,4-phenylene group and naphthalene-2,6-diyl group, Z1 is one among COO—, OCO— and a single bond, and n is one of 0, 1 and 2.

More particularly, the reactive mesogen material may include one of the compounds represented as follows.

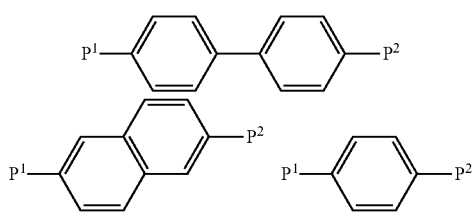

In the above compounds, P1 and P2 may include at least one of acrylate, methacrylate, vinyl, vinyloxy and epoxy groups.

In accordance with example embodiments, the liquid crystal composition may include the nematic liquid crystal and the achiral smectic liquid crystal, and the alignment of the liquid crystal composition may become uniform, and the stability of the alignment may be improved. In addition, through including the reactive mesogen material in the liquid crystal composition, the alignment rate of the liquid crystal composition may be increased, and the angle of the alignment may be increased to improve optical properties.

In accordance with other example embodiments, the liquid crystal composition may include the achiral liquid crystal, the nematic liquid crystal, the chiral liquid crystal and the reactive mesogen material. The total amount of the achiral smectic liquid crystal and the chiral liquid crystal may be about 1 wt % to about 50 wt % based on the liquid crystal composition. In the liquid crystal composition, the chiral liquid crystal may be included by about 0.01 wt % to about 10 wt %. The reactive mesogen material may be included by about 0.01 wt % to about 3 wt % based on the liquid crystal composition.

The explanation on the achiral liquid crystal, the nematic liquid crystal, the chiral liquid crystal and the reactive mesogen material may be referred to the explanation above.

In accordance with example embodiments, the liquid crystal composition may include the achiral liquid crystal, the nematic liquid crystal and the chiral liquid crystal, and the alignment of the liquid crystal may become uniform, and the stability of the alignment may be improved. In addition, through including the reactive mesogen material in the liquid crystal composition, the alignment rate of the liquid crystal composition may be increased, and the angle of the alignment may be increased to improve optical properties.

Liquid Crystal Composition_Second Embodiment

The liquid crystal composition in accordance with example embodiments may include a nematic liquid crystal and a smectic liquid crystal. The liquid crystal composition may include about 50 wt % to about 97 wt % of the nematic liquid crystal and about 3 wt % to about 50 wt % of the smectic liquid crystal. When the amount of the smectic liquid crystal is about 3 wt % or less based on the liquid crystal composition, the alignment of the liquid crystal of the liquid crystal composition may be unstable. When the amount of the smectic liquid crystal exceeds about 50 wt % based on the liquid crystal composition, the viscosity of the liquid crystal composition may be increased, and the response time of a display device including the liquid crystal composition may be decreased. More particularly, the liquid crystal composition may include about 3 to about 35 wt % of the smectic liquid crystal.

The amount of the smectic liquid crystal in the liquid crystal composition may be determined by the viscosity of the smectic liquid crystal. When the viscosity of the smectic liquid crystal is low, the amount of the smectic liquid crystal in the liquid crystal composition may be about 50 wt % or more. When the viscosity of the smectic liquid crystal is high, the amount of the smectic liquid crystal may be preferably kept to about 30 wt % or less considering the total viscosity of the liquid crystal composition.

In accordance with example embodiments, the smectic liquid crystal may include an achiral smectic liquid crystal and a chiral smectic liquid crystal. The smectic liquid crystal may include about 70 wt % to about 97 wt % of the achiral smectic liquid crystal and about 3 wt % to about 30 wt % of the chiral smectic liquid crystal.

The chiral smectic liquid crystal may have spontaneous polarization properties. The spontaneous polarization represents an electric polarization state of a material in a natural state without applying an electric field. The explanation on the chiral smectic liquid crystal will be described in detail below.

In accordance with example embodiments, the nematic liquid crystal may include the negative nematic liquid crystal. In accordance with other example embodiments, the nematic liquid crystal may include a negative nematic liquid crystal and a positive nematic liquid crystal. The positive nematic liquid crystal may be included by about 10 wt % based on the nematic liquid crystal.

The constituting elements, structures and examples of the nematic liquid crystal, the achiral smectic liquid crystal of the smectic liquid crystal may be substantially the same as those explained above, and detailed description will be omitted.

Hereinafter, the chiral smectic liquid crystal will be explained in detail.

The chiral smectic liquid crystal may include chiral smectic liquid crystal molecules. In one aspect, the chiral smectic liquid crystal molecules may be one kind. In another aspect, the chiral smectic liquid crystal may include different kinds of the chiral smectic liquid crystal molecules. Particularly, the chiral smectic liquid crystal molecules may include first chiral smectic liquid crystal molecules and second chiral smectic liquid crystal molecules. The first and second chiral smectic liquid crystal molecules may be different from each other.

In accordance with other example embodiments, the chiral smectic liquid crystal may include the chiral smectic liquid crystal molecules and base liquid crystal molecules. The base liquid crystal molecules may include at least one selected from liquid crystal molecules having negative dielectric anisotropy, liquid crystal molecules having positive dielectric anisotropy, neutral liquid crystal molecules and achiral liquid crystal molecules.

In accordance with other example embodiments, the chiral smectic liquid crystal along with the achiral liquid crystal molecules may represent ferroelectric properties.

The chiral smectic liquid crystal may include chiral smectic C liquid crystal and other chiral smectic liquid crystal.

The chiral smectic C may be represented by Chemical Formulae 57 to 60.

Chemical Formula 57

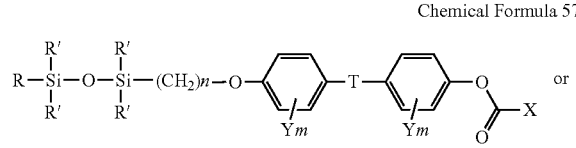

Chemical Formula 58

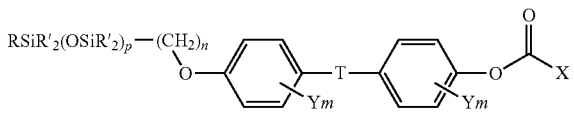

In Chemical Formulae 57 and 58, R is an alkyl group having 1 to 10 carbon atoms or

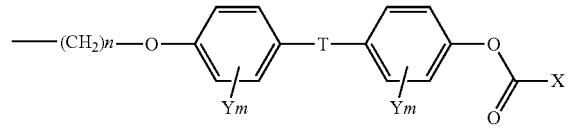

group, $R^1$ is an alkyl group having 1 to 4 carbon atoms, T is

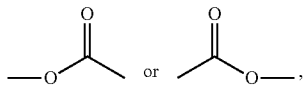

X is an alkyl or a halogen substituted alkyl group having at least one chiral center, Y is a fluorine atom, m is 0, 1 or 2, p is 2, 3 or 4, and n is 10, 11 or 12.

Chemical Formula 59

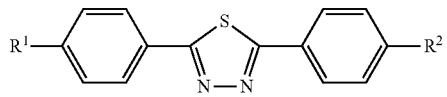

In Chemical Formula 59, $R^1$ and $R^2$ are a linear alkyl group including 1 to 9 carbon atoms and are different from each other.

Chemical Formula 60

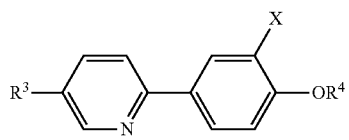

In Chemical Formula 60, $R^3$ and $R^4$ are an alkyl group including 1 to 18 carbon atoms and are different from each other or the same, and X is hydrogen or fluorine.

Chemical Formula 61

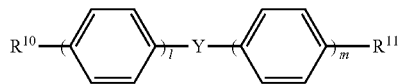

In Chemical Formula 61, m is 1 or 2, Y is —COO—, —CH=N—, —CH$_2$O—, —OCO—, —N=CH—, —OCH$_2$— or a single connecting group, $R^{10}$ is an alkyl or an alkoxy group having 1 to 18 carbon atoms, and $R^{11}$ is (S)-2-methylbutyl, (S)-2-methylbutoxy, (S)-2-methylbutoxycarbonyl, (S)-1-methylheptyloxy, (R)-1-methylheptyloxy, (S)-1-methylheptyloxycarbonyl or (R)-1-methylheptyloxycarbonyl.

Chemical Formula 62

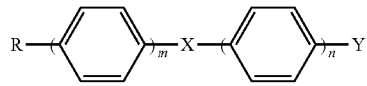

In Chemical Formula 62, n is 1 or 2, R is an alkyl or an alkoxy group including 1 to 18 carbon atoms, Y is an alkyl, an alkoxy, an alkoxycarbonyl, an alkanoyl or an alkanoyloxy group having achiral carbon, X includes

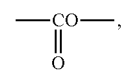

—CH=N—, —CH$_2$O—,

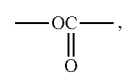

—N=CH—, —OCH$_2$— group.

In Chemical Formula 62, Y may be one of

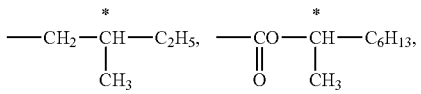

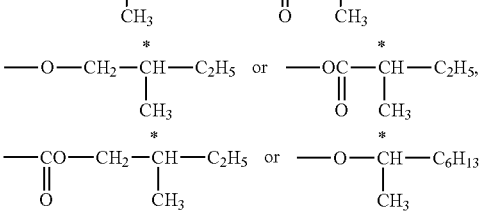

group.

In accordance with example embodiments, the liquid crystal composition includes the nematic liquid crystal, the achiral smectic liquid crystal and the chiral smectic liquid crystal, and the alignment of the liquid crystal composition may be uniform and the stability of the alignment may be improved.

In accordance with other example embodiments, the liquid crystal composition may further include a chiral dopant. The chiral dopant may be included in the liquid crystal composition by about 10 wt % or less. In one aspect, the chiral dopant may not have spontaneous polarization properties. In another aspect, the spontaneous polarization properties of the chiral dopant may be smaller than that of the chiral smectic liquid crystal.

In accordance with example embodiments, the chiral dopant may include a plurality of chiral dopants. In one aspect, the chiral dopants may be one kind. In other aspect, the chiral dopants may be different kinds from each other.

In accordance with other example embodiments, the chiral dopant may illustrate ferroelectric properties along with the smectic liquid crystal.

Hereinafter, examples of the chiral dopant may be illustrated. The following materials may be used alone or as a mixture. In addition, the chiral dopant may not be limited to the following examples.

The chiral dopant may be at least one selected from Chemical Formulae 63 to 70.

In accordance with example embodiments, the liquid crystal composition may include the nematic liquid crystal, the achiral smectic liquid crystal and the chiral smectic liquid crystal, and the alignment of the liquid crystal composition may be uniform, and the stability of the alignment may be improved. Since the liquid crystal composition may further include the chiral dopant, the ferroelectric properties may be illustrated along with the smectic liquid crystal.

Chemical Formula 63

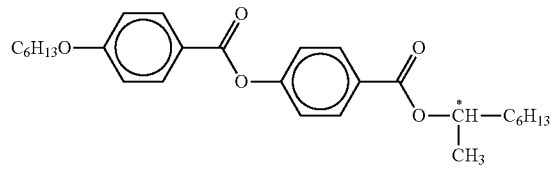

Chemical Formula 64

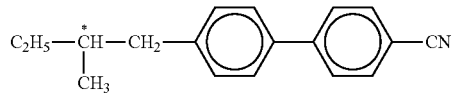

Chemical Formula 65

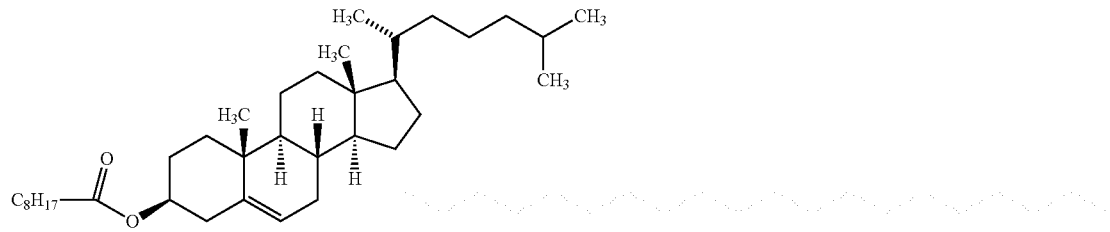

Chemical Formula 66

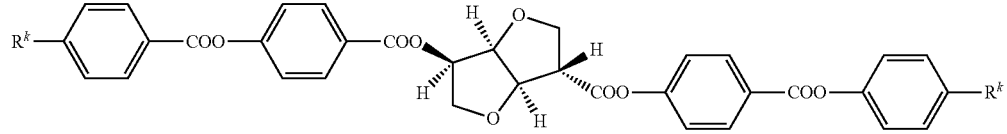

Chemical Formula 67

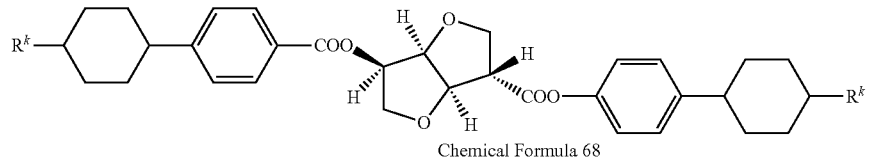

Chemical Formula 68

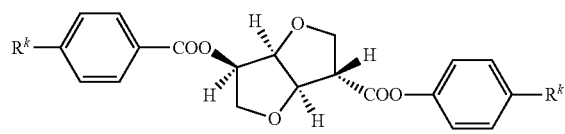

Chemical Formula 69

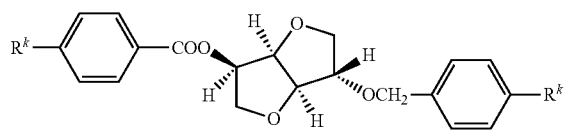

Chemical Formula 70

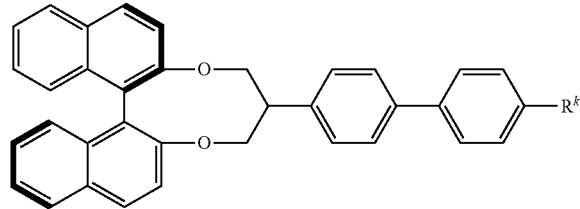

In Chemical Formulae 66 to 70, $R^K$ is an alkyl group including 3 to 10 carbon atoms, —$CH_2$— adjacent to an alkyl ring may be substituted with —O—, and an optional —$CH_2$— may be substituted with —CH—CH—.

The chiral dopant may include various commercially available chiral dopants including cholesteryl nonanoate (CN), R-811, S-811, S-1011, S-2011 (Merck KGaA at Darmstadt, Germany) and CB15 (BDH Chemicals Ltd., at Poole, England).

Thus, the alignment of the liquid crystal may be more uniform and the stability of the alignment may be further improved.

In accordance with other example embodiments, the liquid crystal composition may further include a reactive mesogen material. The liquid crystal composition may include about 0.01 wt % to about 3 wt % of the reactive mesogen material. Detailed explanation on the reactive mesogen material will be omitted.

In accordance with example embodiments, the liquid crystal composition may include the nematic liquid crystal, the achiral smectic liquid crystal and the chiral smectic liquid crystal, and the alignment of the liquid crystal composition may be uniform, and the stability of the alignment may be improved. Since the liquid crystal composition may include the reactive mesogen material, the alignment rate of the liquid crystal composition may be increased, and the alignment angle may be increased to improve optical properties.

In accordance with other example embodiments, the liquid crystal composition may include the nematic liquid crystal, the smectic liquid crystal, the chiral dopant and the reactive mesogen material. The liquid crystal composition may include about 3 wt % to about 50 wt % of the smectic liquid crystal, about 10 wt % or less of the chiral dopant, and about 0.01 wt % to about 3 wt % of the reactive mesogen material. The explanation on the nematic liquid crystal, the smectic liquid crystal, the chiral dopant and the reactive mesogen material will be omitted.

In accordance with example embodiments, since the liquid crystal composition includes the nematic liquid crystal, the achiral smectic liquid crystal, the chiral smectic liquid crystal and the chiral dopant, the alignment of the liquid crystal composition may be uniform and the stability of the alignment may be improved. In addition, through including the reactive mesogen material in the liquid crystal composition, the alignment rate of the liquid crystal composition may be increased, and the alignment angle may be increased to improve the optical properties.

(Method of Preparing Liquid Crystal Composition)

In accordance with example embodiments, the liquid crystal composition may be prepared by mixing a nematic liquid crystal and an achiral smectic liquid crystal. The liquid crystal composition may be prepared by mixing about 50 wt % to about 99 wt % of the nematic liquid crystal, and about 1 wt % to about 50 wt % of the achiral smectic liquid crystal.

In one aspect, the liquid crystal composition may further include a chiral liquid crystal. The liquid crystal composition may be prepared by mixing about 10 wt % or less of the chiral liquid crystal, about 1 wt % to about 50 wt % of the achiral smectic liquid crystal and the remaining amount of the nematic liquid crystal.

In another aspect, the liquid crystal composition may further include the reactive mesogen material. The liquid crystal composition may be prepared by mixing about 0.01 wt % to about 3 wt % of the reactive mesogen material, about 1 to about 50 wt % of the achiral smectic liquid crystal and the remaining amount of the nematic liquid crystal.

In further another aspect, the liquid crystal composition may include the nematic liquid crystal, the achiral smectic liquid crystal, the chiral liquid crystal and the reactive mesogen material. The liquid crystal composition may be prepared by mixing about 0.01 wt % to about 3 wt % of the reactive mesogen material, about 10 wt % or less of the chiral liquid crystal, about 1 wt % to about 50 wt % of the achiral smectic liquid crystal and the remaining amount of the nematic liquid crystal.

In accordance with other example embodiments, the liquid crystal composition may be prepared by mixing the nematic liquid crystal and the smectic liquid crystal. The liquid crystal composition may be prepared by mixing about 50 wt % to about 97 wt % of the nematic liquid crystal and about 3 wt % to about 50 wt % of the smectic liquid crystal. The smectic liquid crystal may include the achiral smectic liquid crystal and the chiral smectic liquid crystal. The smectic liquid crystal may include about 70 wt % to about 97 wt % of the achiral smectic liquid crystal and about 3 wt % to about 30 wt % of the chiral smectic liquid crystal.

In one aspect, the liquid crystal composition may further include the chiral dopant. The liquid crystal composition may be prepared by mixing about 10 wt % or less of the chiral dopant, about 3 wt % to about 50 wt % of the smectic liquid crystal and the remaining amount of the nematic liquid crystal.

In another aspect, the liquid crystal composition may further include a reactive mesogen material. The liquid crystal composition may be prepared by mixing about 0.01 wt % to about 3 wt % of the reactive mesogen material, about 3 wt % to about 50 wt % of the smectic liquid crystal and the remaining amount of the nematic liquid crystal.

In further another aspect, the liquid crystal composition may include the nematic liquid crystal, the smectic liquid crystal, the chiral dopant and the reactive mesogen material. The liquid crystal composition may be prepared by mixing about 10 wt % or less of the chiral dopant, about 0.01 wt % to about 3 wt % of the reactive mesogen material, about 3 wt % to about 50 wt % of the smectic liquid crystal and the remaining amount of the nematic liquid crystal.

During conducting the mixing process, the processing temperature may be a temperature at which a material having the largest amount in the liquid crystal composition may illustrate isotropic properties. In accordance with example embodiments, the mixing process may be conducted at a temperature range of about 90° C. to about 100° C. In the temperature range, the nematic liquid crystal may illustrate the isotropic properties. In example embodiments, the mixing process of the liquid crystal composition may be conducted at a temperature range of about 90° C. to about 100° C., however, the temperature of the mixing of the liquid crystal composition may not be limited in example embodiments.

(Liquid Crystal Display Device)

FIG. 1 is a cross-sectional view illustrated for explaining a liquid crystal display device in accordance with example embodiments.

Referring to FIG. 1, a liquid crystal display device may include a first displaying plate 100, a second displaying plate 200 separately facing the first displaying plate 100, and a liquid crystal layer 300 disposed between the first and second displaying plates 100 and 200.

The first displaying plate 100 may include a first substrate 110, a first electrode 120 and a first alignment layer 170, and the first substrate 110, the first electrode 120 and the first alignment layer 170 may be integrated one by one.

The first electrode 120 may include a transparent conductive material, such as indium tin oxide (ITO), or indium zinc oxide (IZO). In accordance with example embodiments, the first electrode 120 may include a first slit formed by partially patterning the first electrode 120.

The first alignment layer 170 may include an alignment base material and a reactive mesogen material. The alignment base material of the first alignment layer may include at least one selected from the group consisting of polyimide, polyvinyl alcohol (PVA), polystyrene and nylon. In addition, the reactive mesogen material may be substantially the same as described above, and detailed description may be omitted. In accordance with other example embodiments, the first alignment layer 170 may be omitted.

The second displaying plate 200 may include a second substrate 210, a second electrode 220 and a second alignment layer 270, and the second substrate 210, the second electrode 220 and the second alignment layer 270 may be integrated one by one. The first and second displaying plates 100 and 200 may be disposed so that the first and second alignment layers 170 and 270 may face.

The second electrode 220 may include the same or similar material as the first electrode 220. Into the second electrode 220, a voltage different from the first electrode 120 may be applied. In accordance with example embodiments, the second electrode 220 may include a second slit formed by partially patterning the second electrode 220.

The second alignment layer 270 may include an alignment base material and a reactive mesogen material. The alignment base material of the second alignment layer may be similar to or substantially the same as the alignment base material of the first alignment layer. Examples of the reactive mesogen material are substantially the same as described above, and detailed description will be omitted. In accordance with other example embodiments, the second alignment layer 270 may be omitted.

The liquid crystal layer 300 may be disposed between the first and second displaying plates 100 and 200. The liquid crystal layer 300 may include the liquid crystal composition as described above, and detailed description will be referred to the above description.

In example embodiments, the first and second electrodes 120 and 220 may be explained as being disposed at each of the first and second displaying plates 100 and 200. However, the first and second electrodes 120 and 220 may be disposed on one of the first or second displaying plates 100 and 200. In addition, the first and second electrodes 120 and 220 may be disposed on the same layer, or the first and second electrodes 120 and 220 may be disposed on different layers with an insulating layer between them. In addition, the first and second slits may be formed in one of the first and second electrodes 120 and 220.

Figure 2:
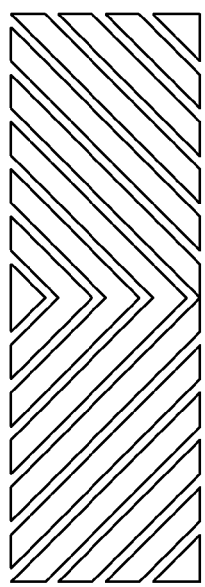
FIG. 2 is a plan view illustrated for explaining the slit shape of electrodes in accordance with an example embodiment.

FIG. 2 is a plan view illustrated for explaining the slit shape of electrodes in accordance with example embodiments.

Referring to FIG. 2, at least one electrode among the first and second electrodes 120 and 220 may have a chevron pattern. The chevron pattern may have a V shape including a first straight line extended in a first direction and a second straight line extended in a second direction which is other direction crossing the first direction.

In accordance with example embodiments, the first and second slits having the chevron pattern are explained as an example, however, the structures of the first and second slits are not limited to the shape.

Hereinafter, the present inventive concept will be explained in more detail referring to examples and comparative examples. However, the following examples are embodied for illustration, and the present invention will not be limited to the following examples, and various modification and changes may be included.

Liquid Crystal Display Device

Comparative Example

A liquid crystal display device including a first displaying plate including a first substrate and a first electrode having a first slit of chevron pattern, a second displaying plate including a second substrate and a second electrode having a second slit of chevron pattern, and a liquid crystal layer filling up a space between the first and second displaying plates was manufactured. The liquid crystal display device was manufactured in a patterned vertical alignment (PVA) mode.

The liquid crystal layer was manufactured by using about 100 wt % of MLC 6608 ($\Delta n=0.084$, ($\Delta \in =-4.3$) purchased by Merck Co. The thickness (cell gap) of the liquid crystal layer of the liquid crystal display device was about 4.5 μm.

Example 1

A liquid crystal display device including a first displaying plate including a first substrate and a first electrode having a first slit of chevron pattern, a second displaying plate including a second substrate and a second electrode having a second slit of chevron pattern, and a liquid crystal layer filling up a space between the first and second displaying plates was manufactured. The liquid crystal display device was manufactured in a patterned vertical alignment (PVA) mode.

The liquid crystal layer was manufactured by using a liquid crystal composition prepared by mixing at about 100° C. of about 97 wt % of MLC 6608 ($\Delta n=0.084$, ($\Delta \in =-4.3$) purchased by Merck Co., and about 3 wt % of KFLC 7 ($\Delta n=0.18$) purchased by Kingston Chemical Co. The thickness of the liquid crystal layer of the liquid crystal display device was about 4.5 μm. About 3 wt % of the KFLC 7 included about 2.8 wt % of an achiral component and about 0.2 wt % of a chiral component.

Example 2

A liquid crystal display device was manufactured through conducting the same process as explained in Example 1 except for the material in the liquid crystal layer.

The liquid crystal layer was manufactured by using a liquid crystal composition prepared by mixing at about 100° C. of about 95 wt % of MLC 6608 ($\Delta n=0.084$, ($\Delta \in =-4.3$) purchased by Merck Co., and about 5 wt % of KFLC 10 ($\Delta n=0.18$) purchased by Kingston Chemical Co. About 5 wt % of the KFLC 10 included about 4.5 wt % of an achiral component and about 0.5 wt % of a chiral component.

Example 3

A liquid crystal display device was manufactured through conducting the same process as explained in Example 1 except for the material in the liquid crystal layer.

The liquid crystal layer was manufactured by using a liquid crystal composition prepared by mixing at about 100° C. of about 90 wt % of MLC 6608 ($\Delta n=0.084$, $\Delta \in =-4.3$) purchased by Merck Co., and about 10 wt % of KFLC 3 ($\Delta n=0.18$) purchased by Kingston Chemical Co. About 10 wt % of the KFLC 3 included about 9.7 wt % of an achiral component and about 0.3 wt % of a chiral component.

Example 4

A liquid crystal display device was manufactured through conducting the same process as explained in Example 1 except for the material in the liquid crystal layer.

The liquid crystal layer was manufactured by using a liquid crystal composition prepared by mixing at about 100° C. of about 90 wt % of MLC 6608 ($\Delta n=0.084$, $\Delta \in =-4.3$) purchased by Merck Co., and about 10 wt % of KFLC 10 ($\Delta n=0.18$) purchased by Kingston Chemical Co. About 10 wt % of the KFLC 10 included about 9.0 wt % of an achiral component and about 1.0 wt % of a chiral component.

Example 5

A liquid crystal display device was manufactured through conducting the same process as explained in Example 1 except for the material in the liquid crystal layer.

The liquid crystal layer was manufactured by using a liquid crystal composition prepared by mixing at about 100° C. of about 85 wt % of MLC 6608 ($\Delta n=0.084$, $\Delta \in =-4.3$) purchased by Merck Co., and about 15 wt % of KFLC 5 ($\Delta n=0.18$) purchased by Kingston Chemical Co. About 15 wt % of the KFLC 5 included about 14.3 wt % of an achiral component and about 0.7 wt % of a chiral component.

Example 6

A liquid crystal display device was manufactured through conducting the same process as explained in Example 1 except for the material in the liquid crystal layer.

The liquid crystal layer was manufactured by using a liquid crystal composition prepared by mixing at about 100° C. of about 80 wt % of MLC 6608 ($\Delta n=0.084$, $\Delta \in =-4.3$) purchased by Merck Co., and about 20 wt % of KFLC 7 ($\Delta n=0.18$) purchased by Kingston Chemical Co. About 20 wt % of the KFLC 7 included about 18.6 wt % of an achiral component and about 1.6 wt % of a chiral component.

Example 7

A liquid crystal display device was manufactured through conducting the same process as explained in Example 1 except for the material in the liquid crystal layer.

The liquid crystal layer was manufactured by using a liquid crystal composition prepared by mixing at about 100° C. of about 70 wt % of MLC 6608 ($\Delta n=0.084$, $\Delta \in =-4.3$) purchased by Merck Co., and about 30 wt % of KFLC 3 ($\Delta n=0.18$) purchased by Kingston Chemical Co. About 30 wt % of the KFLC 3 included about 29.1 wt % of an achiral component and about 0.9 wt % of a chiral component.

The constituting elements and the thickness of the liquid crystal layer in Comparative Example and Examples 1 to 7 are illustrated in following Table 1.

TABLE 1

|  | Nematic liquid crystal | Smectic liquid crystal | | Thickness of liquid crystal layer |
| --- | --- | --- | --- | --- |
|  |  | Achiral components | Chiral components |  |
| Comparative example | 100 wt % | 0 wt % | 0 wt % | 4.5 μm |
| Example 1 | 97 wt % | 2.8 wt % | 0.2 wt % | 4.5 μm |
| Example 2 | 95 wt % | 4.5 wt % | 0.5 wt % | 4.5 μm |
| Example 3 | 90 wt % | 9.7 wt % | 0.3 wt % | 4.5 μm |
| Example 4 | 90 wt % | 9.0 wt % | 1.0 wt % | 4.5 μm |
| Example 5 | 85 wt % | 14.3 wt % | 0.7 wt % | 4.5 μm |
| Example 6 | 80 wt % | 18.6 wt % | 1.6 wt % | 4.5 μm |
| Example 7 | 70 wt % | 29.1 wt % | 0.9 wt % | 4.5 μm |

Evaluation on Transmittance

Figure 3:
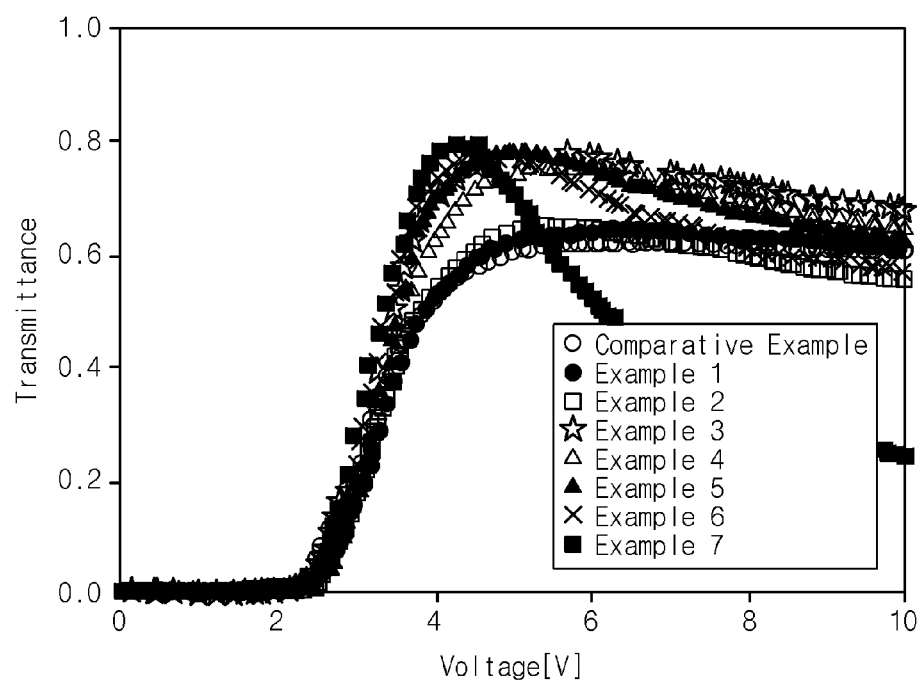
FIG. 3 is a graph illustrated for comparing the transmittances of liquid crystal display devices in accordance with Comparative Example, and Examples 1 to 7.

FIG. 3 is a graph illustrated for comparing the transmittances of liquid crystal display devices in accordance with Comparative Example, and Examples 1 to 7. The graph in FIG. 3 illustrates the transmittances according to applied voltages. In FIG. 3, x-axis represents the applied voltage in [V] units, and y-axis represents the transmittance.

Referring to FIG. 3, the transmittances of the liquid crystal display devices in Examples 1 to 7 are relatively better than the transmittance of the liquid crystal display device in Comparative Example. More particularly, the effects of the transmittances in Examples 1 and 2 are small, however, are increased when compared with the Comparative Example. In addition, the transmittances of the liquid crystal display devices of Examples 3 to 7 are approximately about 0.8 and are better when compared with the transmittance of about 0.6 of the liquid crystal display device in accordance with the Comparative Example.

As evaluated above, the achiral smectic liquid crystal in the liquid crystal layers of Examples 1 to 7 is expected to induce the uniform and stable alignment of the liquid crystal molecules. Thus, the transmittances of the liquid crystal display devices in Examples 1 to 7 are found to be better than the transmittance of the liquid crystal display device in Comparative Example.

Figure 4A:
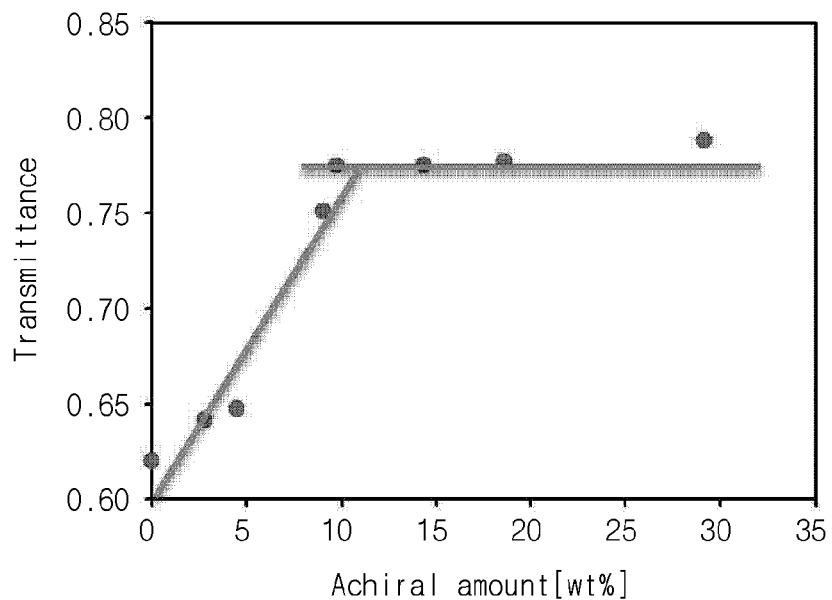
FIG. 4A is a graph illustrating the transmittance of a liquid crystal display device in accordance with Comparative Example, and the transmittances of liquid crystal display devices according to the amounts of an achiral component in liquid crystal layers in accordance with Examples 1 to 7.
Figure 4B:
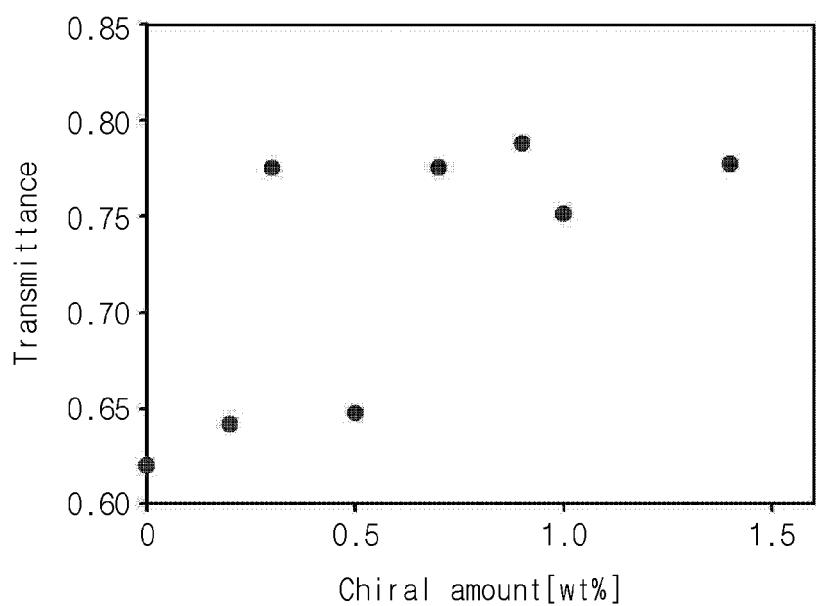
FIG. 4B is a graph illustrating the transmittance of a liquid crystal display device in accordance with Comparative Example, and the transmittances of liquid crystal display devices according to the amounts of a chiral component in liquid crystal layers in accordance with Examples 1 to 7.

FIG. 4A is a graph illustrating the transmittance of a liquid crystal display device in accordance with Comparative Example, and the transmittances of liquid crystal display devices according to the amounts of an achiral component in a liquid crystal layer in accordance with Examples 1 to 7. FIG. 4B is a graph illustrating the transmittance of a liquid crystal display device in accordance with Comparative Example, and the transmittances of liquid crystal display devices according to the amounts of a chiral component in a liquid crystal layer in accordance with Examples 1 to 7. The x-axes in FIGS. 4A and 4B represent the amounts of the achiral component and the chiral component in [wt %] units, and the y-axes represent the transmittances.

Referring to FIG. 4A, as the amount of the achiral component in the liquid crystal layer increases, the transmittance of the liquid crystal display devices are found to be increased. More particularly, the liquid crystal display device in accordance with the Comparative Example excluding the achiral component exhibits the transmittance of about 0.67. As the amount of the achiral component in the liquid crystal layer increases, the transmittance of the liquid crystal display devices are found to be increased. In addition, when the amount of the achiral component in the liquid crystal layer is about 9.7 wt % or more, the transmittance is increased nearly to about 0.8.

Referring to FIG. 4B, as the amount of the chiral component in the liquid crystal layer increases, the transmittance of the liquid crystal display devices are found to be increased in general. More particularly, the transmittance of the liquid crystal display device excluding the chiral component in the Comparative Example is about 0.67, however, the transmittance of the liquid crystal display devices are increased as the amount of the achiral component in the liquid crystal layer increases. In addition, when the amount of the chiral component in the liquid crystal layer is about 0.9 wt % or over, the transmittance is increased to near about 0.8.

Evaluation on Response Time

Figure 5:
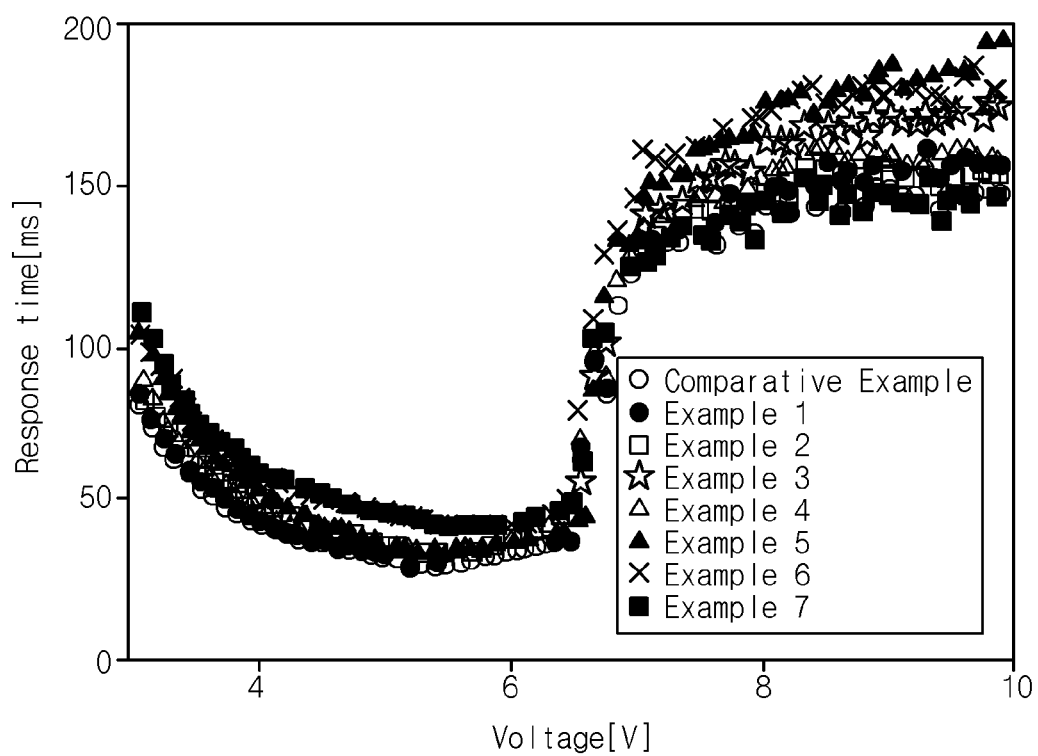
FIG. 5 is a graph illustrated for comparing the response times of liquid crystal display devices in accordance with Comparative Example, and Examples 1 to 7.

FIG. 5 is a graph illustrated for comparing the response times of liquid crystal display devices in accordance with Comparative Example, and Examples 1 to 7. The graph in FIG. 5 illustrates the response times according to applied voltages. In FIG. 5, x-axis represents the applied voltage by [V] units, and y-axis represents the response time by [ms] units.

Referring to FIG. 5, the response times of the liquid crystal display devices of Examples 1 to 7 are somewhat increased when compared with that of the liquid crystal display device of the Comparative Example. The response time of the liquid crystal display device including the liquid crystal layer including about 29.1 wt % of the achiral component in Example 7 is found to be substantially similar to that of the Comparative Example. The somewhat increased response time may be expected to be lowered by changing the amount of the nematic liquid crystal or the kind of the nematic liquid crystal. Or by adding the reactive mesogen material in the liquid crystal layer, the increased response time may be expected to be lowered.

Figure 6:
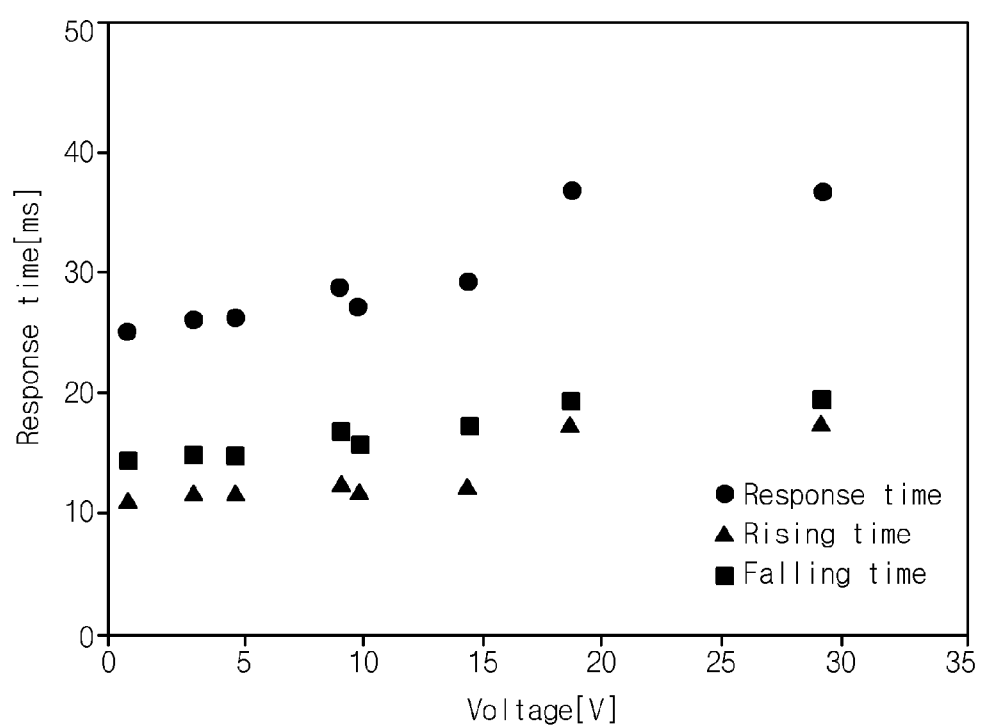
FIG. 6 is a graph illustrating the rising time and the falling time of a liquid crystal display device in accordance with Comparative Example, and the rising times and the falling times of liquid crystal display devices according to the amounts of an achiral component in liquid crystal layers in accordance with Examples 1 to 7.

FIG. 6 is a graph illustrating the rising time and the falling time of a liquid crystal display device in accordance with Comparative Example, and the rising times and the falling times of liquid crystal display devices according to the amounts of an achiral component in a liquid crystal layer in accordance with Examples 1 to 7. In FIG. 6, the x-axis represents the amount of the achiral component by [wt %] units, and the y-axis represents the time by [ms] units.

When the target transmittance of the liquid crystal display device is set to 100% and the liquid crystal display device is on, time is required until the transmittance reaches to 100%. The rising time means the time required for illustrating the transmittance from 10% to 90% after turning on the liquid crystal display device. On the contrary, when the liquid crystal display device is off, time is required until the transmittance reaches to 0%. The falling time means the time required for illustrating the transmittance from 90% to 10% after turning off the liquid crystal display device. The response time is the sum of the rising time and the falling time.

In the Comparative Example, the rising time was about 10 ms, the falling time was about 14 ms, and the response time was measured to about 24 ms. When referring to the data of Examples 1 to 7, the rising time and the falling time are increased along with the increase of the achiral component, and so, the response time tends to somewhat increase.

Figure 7A:
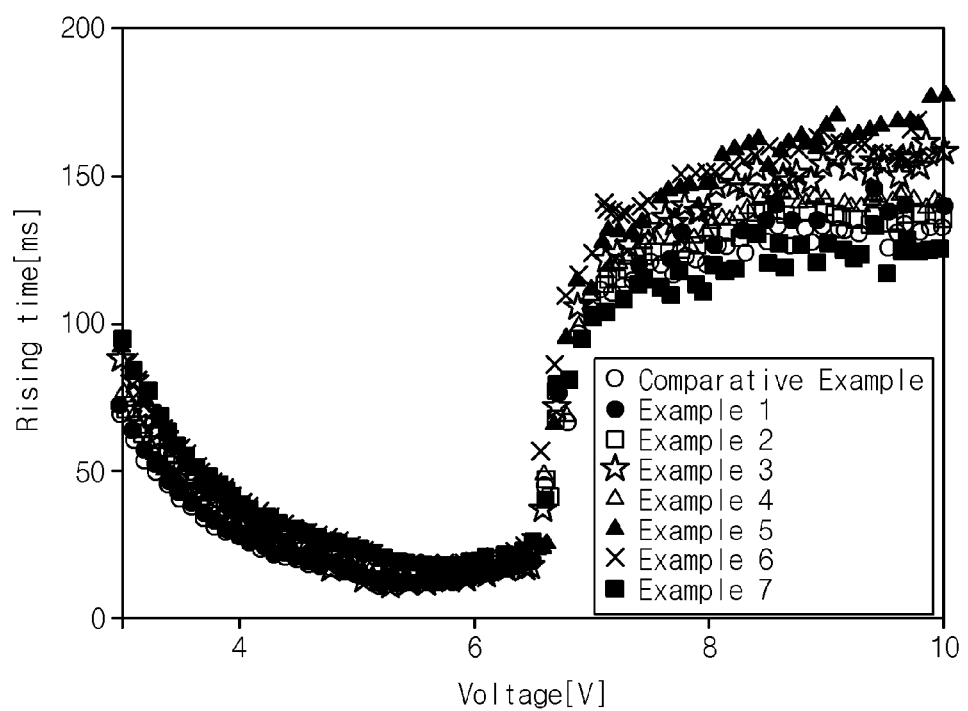
FIG. 7A is a graph illustrating the rising times of liquid crystal display devices in accordance with Comparative Example, and Examples 1 to 7.
Figure 7B:
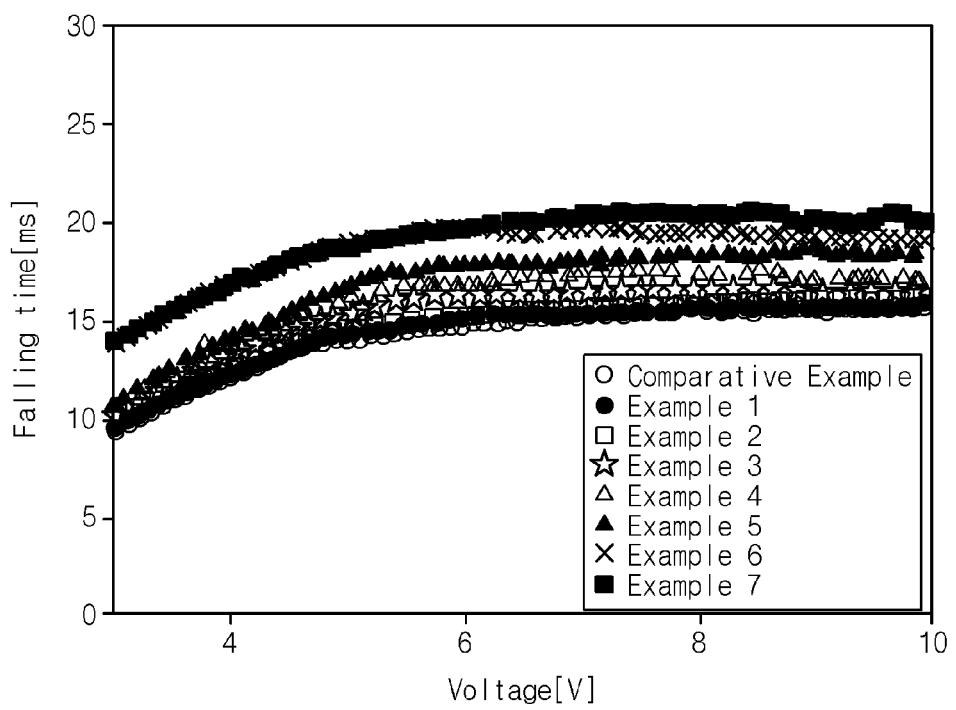
FIG. 7B is a graph illustrating the falling times of liquid crystal display devices in accordance with Comparative Example, and Examples 1 to 7.

FIG. 7A is a graph illustrating the rising times of liquid crystal display devices in accordance with Comparative Example, and Examples 1 to 7, and FIG. 7B is a graph illustrating the falling times of liquid crystal display devices in accordance with Comparative Example, and Examples 1 to 7. FIGS. 7A and 7B are graphs illustrating the rising time and the falling time with respect to applied voltages. In FIGS. 7A and 7B, the x-axes represent the applied voltage by [V] units, and y-axes represent the time by [ms] units.

The results in FIGS. 7A and 7B are similar to the explanation referring to FIGS. 5 and 6. That is, the rising time and the falling time of Examples 1 to 7 are somewhat increased when compared with those of the Comparative Example. The increased rising time and the falling time may be expected to be lowered by adding the reactive mesogen material in the liquid crystal layer.

Texture Evaluation

FIGS. 8A to 8H and 9A to 9H are the textures of liquid crystal display devices in accordance with Comparative Example, and Examples 1 to 7.

In FIGS. 8A to 8H and 9A to 9H, white images and black images were obtained by applying the voltage of 7V into the liquid crystal display devices of Examples 1 to 7 and rotating a cross polarizing plate.

The textures in FIGS. 8A to 8H are white images under the cross polarizing plate. More particularly, the white images are obtained when the angle of the cross polarizing plate and the liquid crystal molecules in the liquid crystal layer is about 45°. The light passed the liquid crystal layer, and bright images may be obtained. The results may be confirmed from following Equation 1.

$$T = \frac{1}{2}\sin^2(2\phi)\sin^2\left(\frac{\pi\Delta n \cdot d}{\lambda}\right) \quad \langle\text{Equation 1}\rangle$$

In Equation 1, T is transmittance, Φ represents an angle between a polarization plate and liquid crystal molecules, Δn represents a double refractive index, d represents the thickness of a liquid crystal layer, and λ represents the wavelength of an incident light. In Equation 1, when Φ is 45°, the value of $\sin^2$ is the maximum value with the maximum transmittance.

Figure 8A:
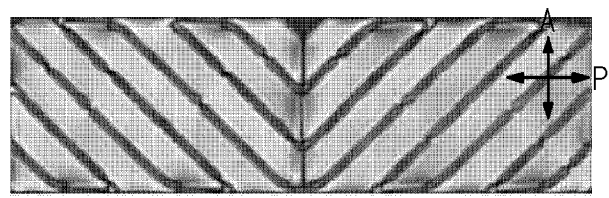
FIGS. 8A to 8H are textures of liquid crystal display devices in accordance with Comparative Example, and Examples 1 to 7.
Figure 8B:
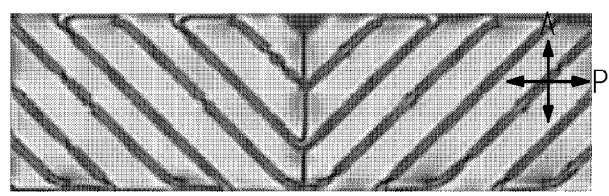
Figure 8C:
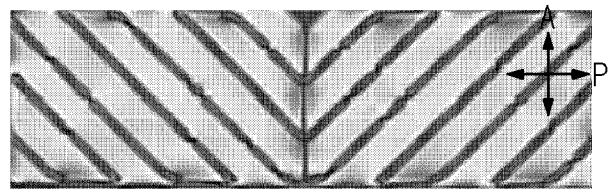
Figure 8D:
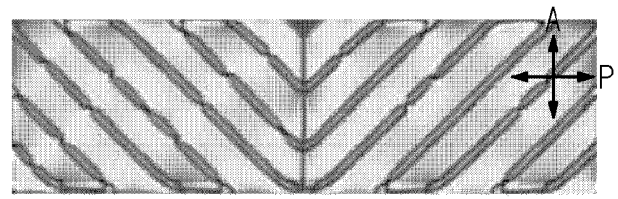
Figure 8E:
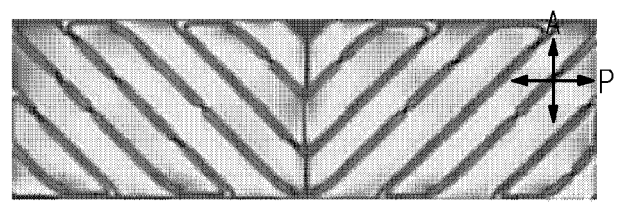
Figure 8F:
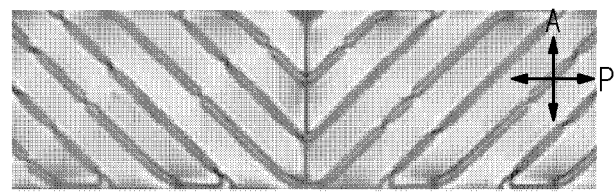
Figure 8G:
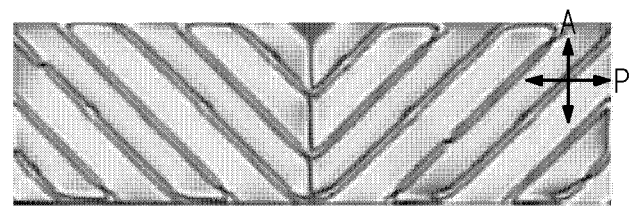
Figure 8H:
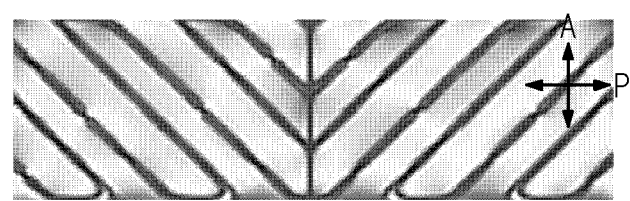

FIGS. 8A to 8H are textures according to the Comparative Example and Examples 1 to 7. Referring to FIG. 8A, defects of black looking at the edge portions of the slits or at the borders of the slits are found. Referring to FIGS. 8B to 8H, the defects at the edge portions of the slits and at the borders of the slits are found to be removed.

The textures in FIGS. 9A to 9H are black images under the cross polarizing plate. More particularly, the black images are obtained when the angle between the cross polarizing plate and the liquid crystal molecules in the liquid crystal layer is 0°. Since a rotated upper polarizing plate has a perpendicular polarization to the polarized light passed through the liquid crystal layer, the black images may be illustrated. In Equation 1, when Φ is 0°, the value of $\sin^2$ is 0, and the transmittance becomes 0.

Figure 9A:
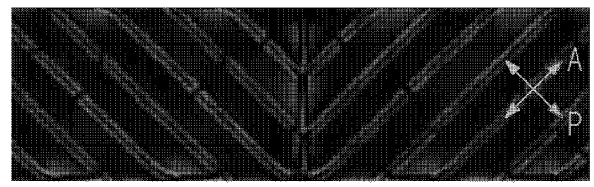
FIGS. 9A to 9H are black textures of liquid crystal display devices in accordance with Comparative Example, and Examples 1 to 7.
Figure 9B:
Figure 9C:
Figure 9D:
Figure 9E:
Figure 9F:
Figure 9G:
Figure 9H:

FIGS. 9A to 9H are textures of the Comparative Example, and Examples 1 to 7. Referring to FIG. 9A, light leaking phenomenon is found at the edge portions of the slits and at the borders of the slits. Referring to FIGS. 8B to 8H, lots of the light leaking phenomenon at the edge portions of the slits and at the borders of the slits is found to be removed when compared with that in FIG. 8A.

When examining the textures, the alignment of the liquid crystal molecules in the liquid crystal layer including the smectic material is homogeneous and stable when compared with the liquid crystal layer excluding the smectic material, and the luminance of the liquid crystal display device may be increased.

Figure 10A:
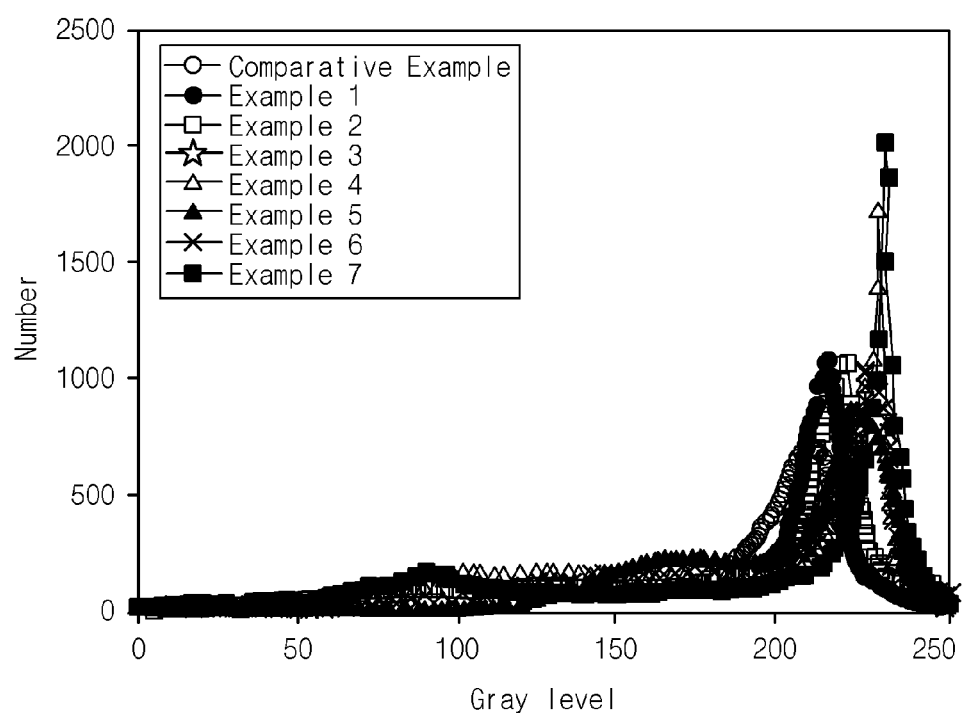
FIGS. 10A and 10B are graphs illustrating gray levels of the textures in accordance with Comparative Example, and Examples 1 to 7.
Figure 10B:
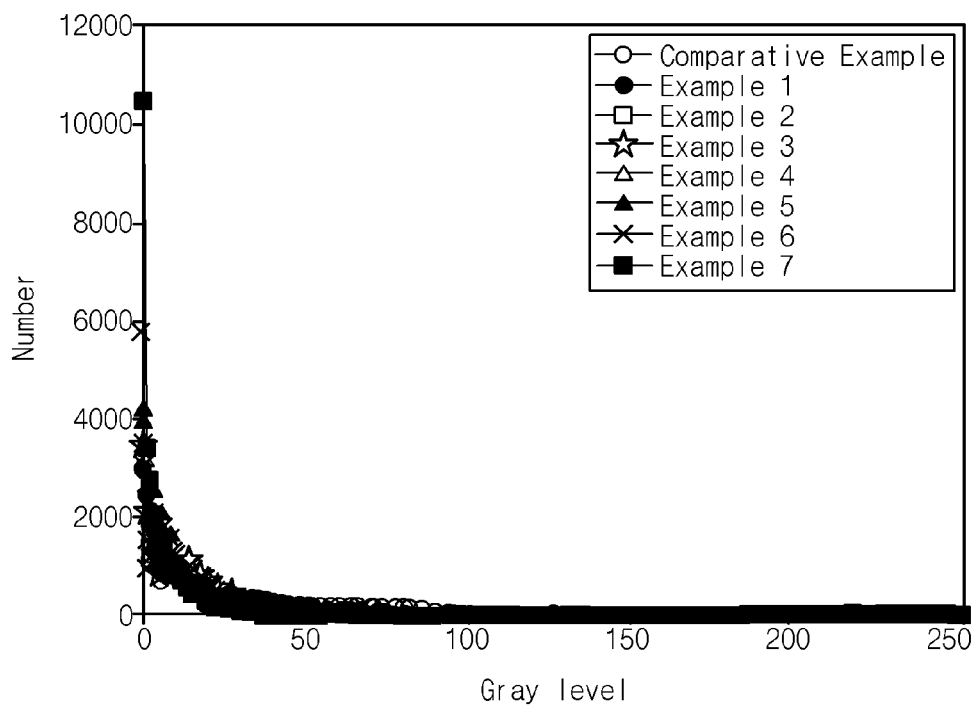

FIGS. 10A and 10B are graphs illustrating the gray levels of the textures in accordance with Comparative Example, and Examples 1 to 7. FIGS. 10A and 10B may be estimated by 256 ($2^8$) gray levels. Gray approaches to black when the gray level approaches to about 0, and the concentration of the gray may be illustrated by levels from about 0 to about 256.

FIG. 10A illustrates the gray level of the textures in FIGS. 8A to 8H and illustrates lots of white images near the gray level of about 255. The texture in FIG. 8A according to the Comparative Example is found a lot in the gray level of about 200 to about 230 and illustrates a large peak width. The textures in FIG. 8B to 8H according to Examples 1 to 7 are found a lot in the gray level of about 235 to about 250 and illustrates a smaller peak width than that of the Comparative Example. The textures are increased from Example 1 to Example 7 and found a lot in the gray level of about 250, and illustrate the decrease in the peak width.

FIG. 10B illustrates the gray level of the textures in FIGS. 9A to 9H and illustrates lots of black images near the gray level of about 0. The texture in FIG. 9A according to the Comparative Example is found a lot in the gray level of about 30 to about 50 and illustrates a large peak width. The texture in FIGS. 9B to 9H according to Examples 1 to 7 are found a lot in the gray level of about 0 to about 25 and illustrates a smaller peak width than that of the Comparative Example. The textures are found a lot in the gray level of about 0 and illustrate the decrease in the peak width When examining the graphs in FIGS. 10A and 10B, the alignment of the liquid crystal molecules in the liquid crystal layer including the smectic material is homogeneous and stable when compared with the liquid crystal layer excluding the smectic material, and the luminance of the liquid crystal display device may be increased.

Figure 11A:
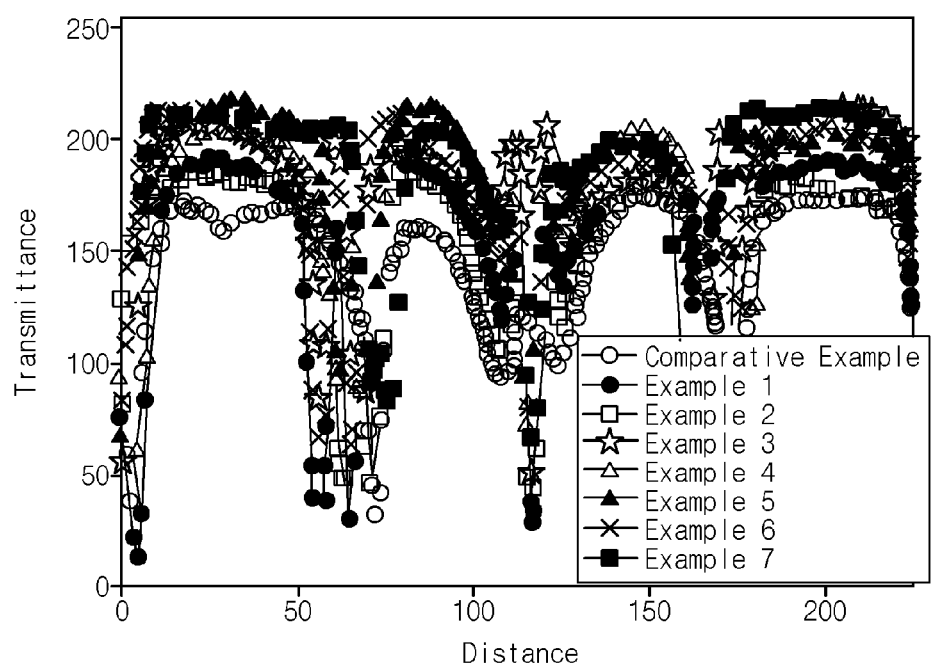
FIGS. 11A and 11B are graphs illustrating transmittances with respect to the distances of the textures in accordance with Comparative Example, and Examples 1 to 7.
Figure 11B:
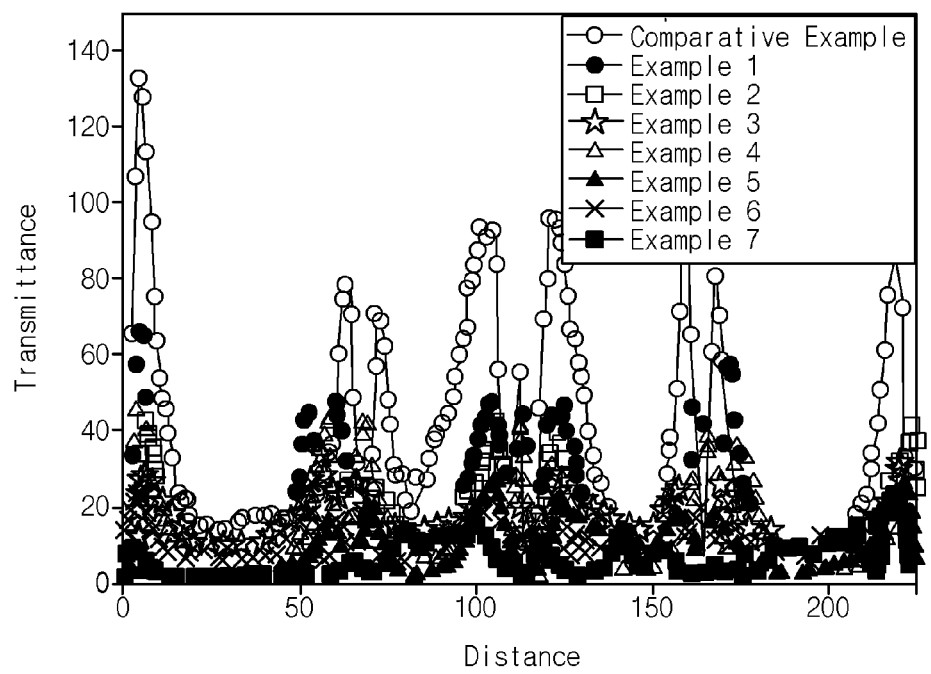

FIGS. 11A and 11B are graphs illustrating the transmittances with respect to the distances of the textures in accordance with Comparative Example, and Examples 1 to 7. FIGS. 11A and 11B are graphs obtained after evaluating the changes of the transmittances according to the distance of the slits after cutting the textures in one direction.

FIG. 11A illustrates the change of the gray levels according to the distance of the slits after cutting the textures in FIGS. 8A to 8H in one direction. Referring to FIG. 11A, the transmittance around the slits are about 20 to about 100 and are found darker than other portions of the slit. The transmittances of the textures around the slits according to Examples 1 to 7 are found to be higher than the transmittance according to the Comparative Example.

FIG. 11B illustrates the change of the gray levels according to the distance of the slits after cutting the textures in FIGS. 9A to 9H in one direction. Referring to FIG. 11B, the transmittance around the slits are about 80 to about 140 and illustrate light leaking defects around the slits in the Comparative Example. The transmittances around the slits according to Examples 1 to 7 are found to be about 20 to about 60 and somewhat settled.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

| [Explanation on Reference Numerals] | |
|---|---|
| 100: first displaying plate | 110: first substrate |
| 120: first electrode | 170: first alignment plate |
| 200: second displaying plate | 220: second electrode |
| 270: second alignment plate | 300; liquid crystal layer |

What is claimed is:

1. A liquid crystal composition comprising:
   3 to 50 wt % of a smectic liquid crystal; and
   a remaining amount of a nematic liquid crystal,
   the smectic liquid crystal including 70 to 97 wt % of an achiral smectic liquid crystal, and 3 to 30 wt % of a chiral smectic liquid crystal,
   wherein the achiral smectic liquid crystal is included more than 9.7 wt % based on total amount of the smectic liquid crystal and the nematic liquid crystal.

2. The liquid crystal composition of claim 1, further comprising a chiral dopant.

3. The liquid crystal composition of claim 2, wherein the chiral smectic liquid crystal has higher spontaneous polarization than the chiral dopant.

4. The liquid crystal composition of claim 1, wherein the nematic liquid crystal comprises a negative nematic liquid crystal.

5. The liquid crystal composition of claim 1, further comprising a reactive mesogen material.

* * * * *